United States Patent
Amano et al.

(10) Patent No.: US 10,832,431 B2
(45) Date of Patent: Nov. 10, 2020

(54) IMAGE PROCESSING APPARATUS, OBJECT RECOGNITION APPARATUS, EQUIPMENT CONTROL SYSTEM, IMAGE PROCESSING METHOD, AND COMPUTER-READABLE RECORDING MEDIUM

(71) Applicant: Ricoh Company, Ltd., Tokyo (JP)

(72) Inventors: Seiya Amano, Kanagawa (JP); Hiroyoshi Sekiguchi, Kanagawa (JP); Soichiro Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 15/991,277

(22) Filed: May 29, 2018

(65) Prior Publication Data
US 2018/0276835 A1    Sep. 27, 2018

Related U.S. Application Data

(63) Continuation of application No. PCT/JP2016/075232, filed on Aug. 29, 2016.

(30) Foreign Application Priority Data

Nov. 30, 2015 (JP) .................... 2015-233373

(51) Int. Cl.
*G06T 7/564* (2017.01)
*G06T 7/00* (2017.01)
(Continued)

(52) U.S. Cl.
CPC .......... *G06T 7/564* (2017.01); *G06K 9/00805* (2013.01); *G06T 7/00* (2013.01);
(Continued)

(58) Field of Classification Search
None
See application file for complete search history.

(56) References Cited

U.S. PATENT DOCUMENTS

| | | | |
|---|---|---|---|
| 8,976,247 B1 * | 3/2015 | Karner | B29C 45/0017 348/148 |
| 2004/0016870 A1 * | 1/2004 | Pawlicki | G06T 7/73 250/208.1 |

(Continued)

FOREIGN PATENT DOCUMENTS

| | | |
|---|---|---|
| JP | 02-171977 | 7/1990 |
| JP | 2013-109760 | 6/2013 |

(Continued)

OTHER PUBLICATIONS

Extended European Search Report dated Nov. 15, 2018 in European Patent Application No. 16870241.3, 9 pages.

(Continued)

*Primary Examiner* — Delomia L Gilliard
(74) *Attorney, Agent, or Firm* — Xsensus LLP

(57) ABSTRACT

According to an embodiment, an image processing apparatus includes a first extracting unit, a second extracting unit, and a detecting unit. The first extracting unit is configured to extract a first region in which an object is represented, from a distance image that is drawn using distance information, based on the distance information of the object calculated from an image of the object captured by an image capturing unit. The second extracting unit is configured to extract a contour direction that is a direction along which pixels forming a contour of the first region are arrayed. The detecting unit is configured to detect a first surface facing the image capturing unit from the first region, based on the contour direction extracted by the second extracting unit.

17 Claims, 24 Drawing Sheets

(51) Int. Cl.
*G08G 1/16* (2006.01)
*G06T 7/11* (2017.01)
*G06K 9/00* (2006.01)

(52) U.S. Cl.
CPC .................. *G06T 7/11* (2017.01); *G08G 1/16* (2013.01); *G06T 2207/10021* (2013.01); *G06T 2207/30261* (2013.01)

(56) References Cited

U.S. PATENT DOCUMENTS

| | | | |
|---|---|---|---|
| 2006/0206243 A1* | 9/2006 | Pawlicki | B60Q 9/008 |
| | | | 701/1 |
| 2009/0147083 A1* | 6/2009 | Pawlicki | G06K 9/00791 |
| | | | 348/119 |
| 2010/0002081 A1* | 1/2010 | Pawlicki | B60T 7/22 |
| | | | 348/148 |
| 2010/0231717 A1 | 9/2010 | Sasaki et al. | |
| 2011/0050714 A1 | 3/2011 | Sekiguchi et al. | |
| 2011/0211068 A1 | 9/2011 | Yokota | |
| 2012/0242835 A1 | 9/2012 | Li et al. | |
| 2013/0010106 A1 | 1/2013 | Yokota | |
| 2013/0057707 A1 | 3/2013 | Hasegawa et al. | |
| 2013/0063600 A1* | 3/2013 | Pawlicki | G06K 9/4604 |
| | | | 348/148 |
| 2013/0128001 A1 | 5/2013 | You et al. | |
| 2013/0250109 A1 | 9/2013 | Yokota | |
| 2014/0204212 A1* | 7/2014 | Pawlicki | G06K 9/00798 |
| | | | 348/148 |
| 2015/0049195 A1 | 2/2015 | Ishigaki et al. | |
| 2015/0248594 A1 | 9/2015 | Zhong et al. | |
| 2015/0294160 A1 | 10/2015 | Takahashi et al. | |
| 2015/0302560 A1 | 10/2015 | Sumiyoshi | |
| 2015/0332103 A1 | 11/2015 | Yokota et al. | |
| 2015/0334269 A1 | 11/2015 | Yokota et al. | |
| 2015/0358610 A1 | 12/2015 | Takahashi et al. | |
| 2016/0014406 A1 | 1/2016 | Takahashi et al. | |
| 2016/0019429 A1 | 1/2016 | Ishigaki et al. | |
| 2016/0046288 A1* | 2/2016 | Pawlicki | G01S 11/12 |
| | | | 701/41 |
| 2016/0131579 A1 | 5/2016 | Sekiguchi et al. | |
| 2016/0261848 A1 | 9/2016 | Sekiguchi et al. | |
| 2018/0056871 A1* | 3/2018 | Karner | B60R 1/06 |

FOREIGN PATENT DOCUMENTS

| | | |
|---|---|---|
| JP | 2014-134856 | 7/2014 |
| JP | 2015-179301 | 10/2015 |
| JP | 2017-052498 | 3/2017 |
| JP | 2017-058890 | 3/2017 |
| WO | 2017/047282 | 3/2017 |

OTHER PUBLICATIONS

Wang, J. et al. "Motion Detection in Driving Environment Using U-V-Disparity", Computer Vision—ACCV 2006, Lecture Notes in Computer Science; XP019027359, 2006, pp. 307-316.

Wang, B. "Geometrical and contextual scene analysis for object detection and tracking in intelligent vehicles", HAL archives-ouvertes, XP055520808, 2015, 160 pages.

Veit, T. "Convexity based fronto-parallel plane detection for stereovision obstacle segmentation", http://citeseerx.ist.psu.edu/viewdoc/download?doi=10.1.1.186.9800&rep=rep1&type=pdf, XP055520865, 2009, 4 pages.

Hu, Z. et al. U-V-Disparity: An efficient algorithm for Stereovision Based Scene Analysis. Intelligent Vehicles Symposium, Proceedings. IEEE, XP010833942, 2005, pp. 48-54.

International Search Report dated Nov. 15, 2016 in PCT/JP2016/075232 filed Aug. 29, 2016 (with English Translation).

Written Opinion dated Nov. 15, 2016 in PCT/JP2016/075232 filed Aug. 29, 2016.

* cited by examiner

FIG.1
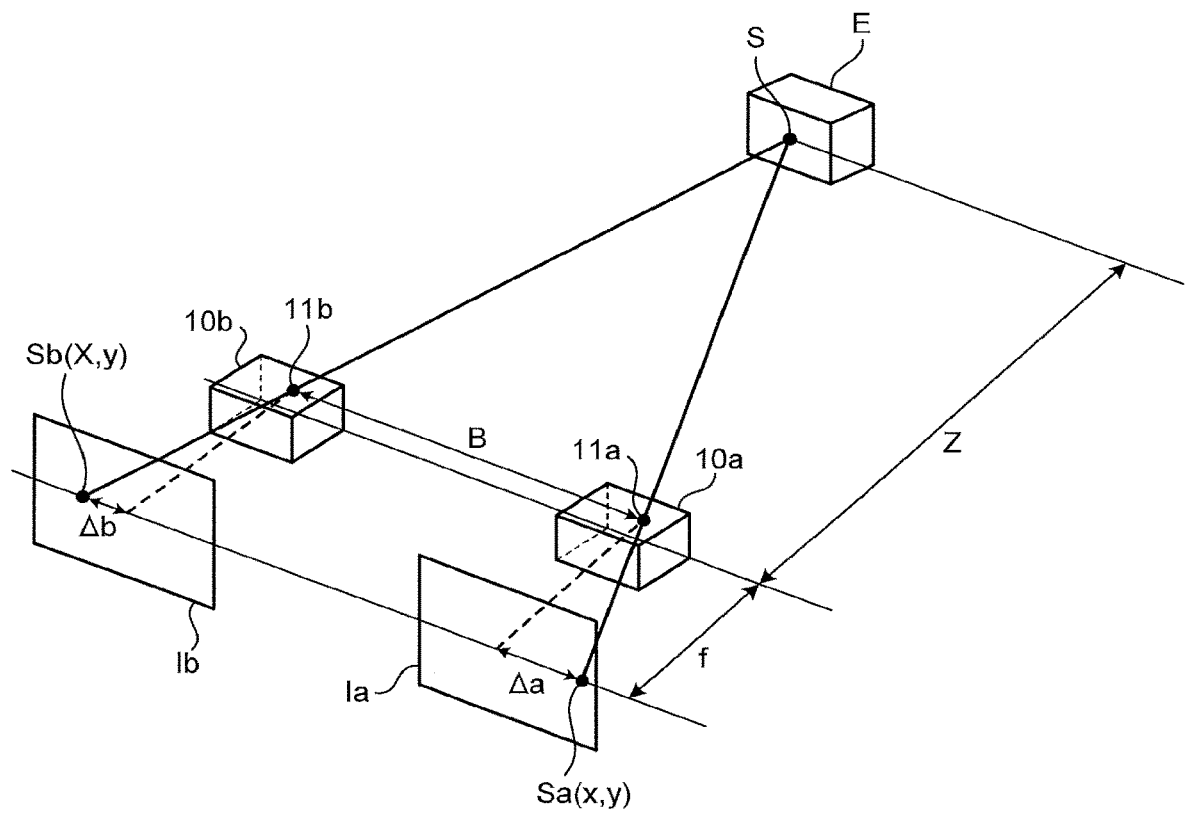
FIG.2
(a) 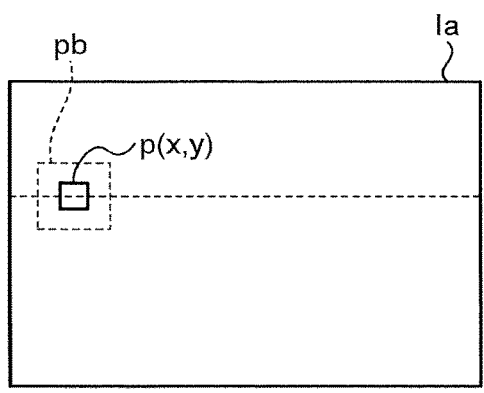
(b) 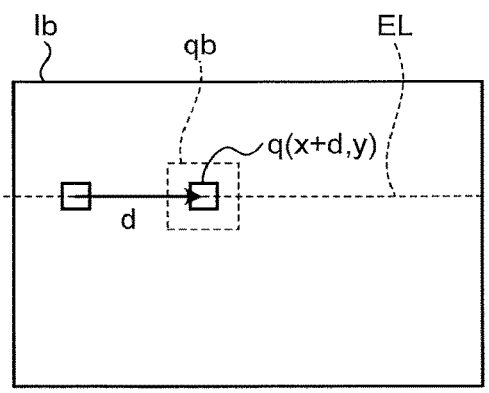

FIG.4
(a)
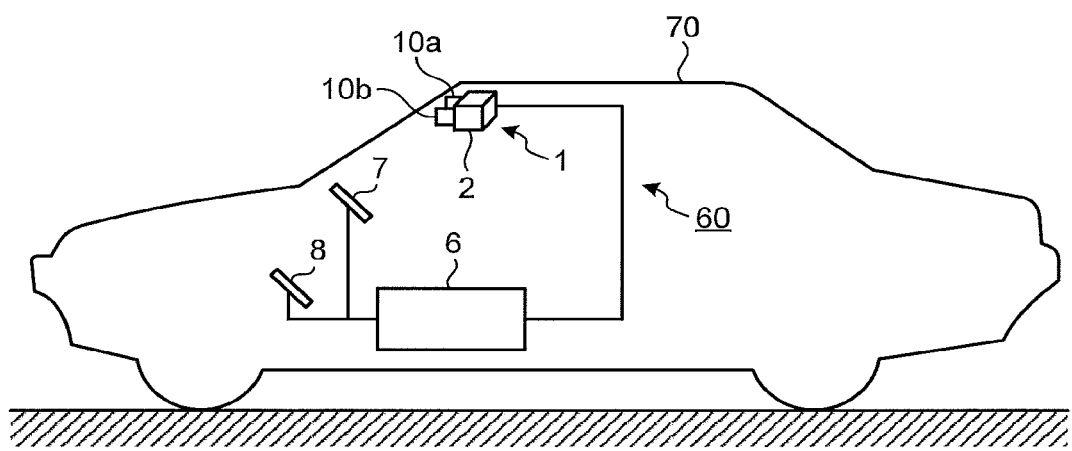
(b)
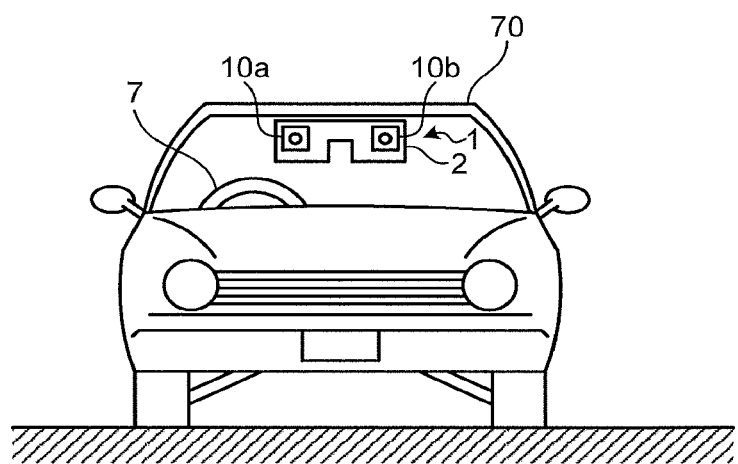

FIG.12
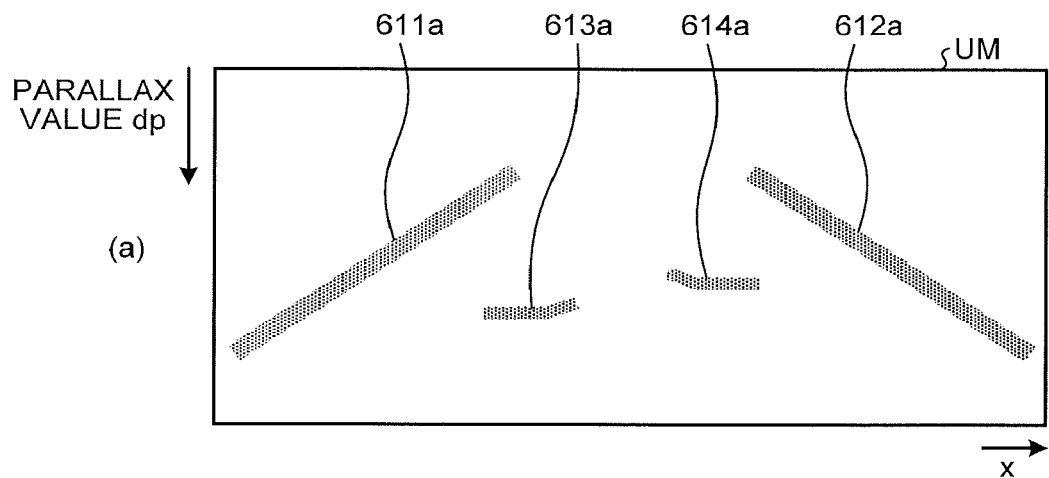
(a)
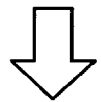
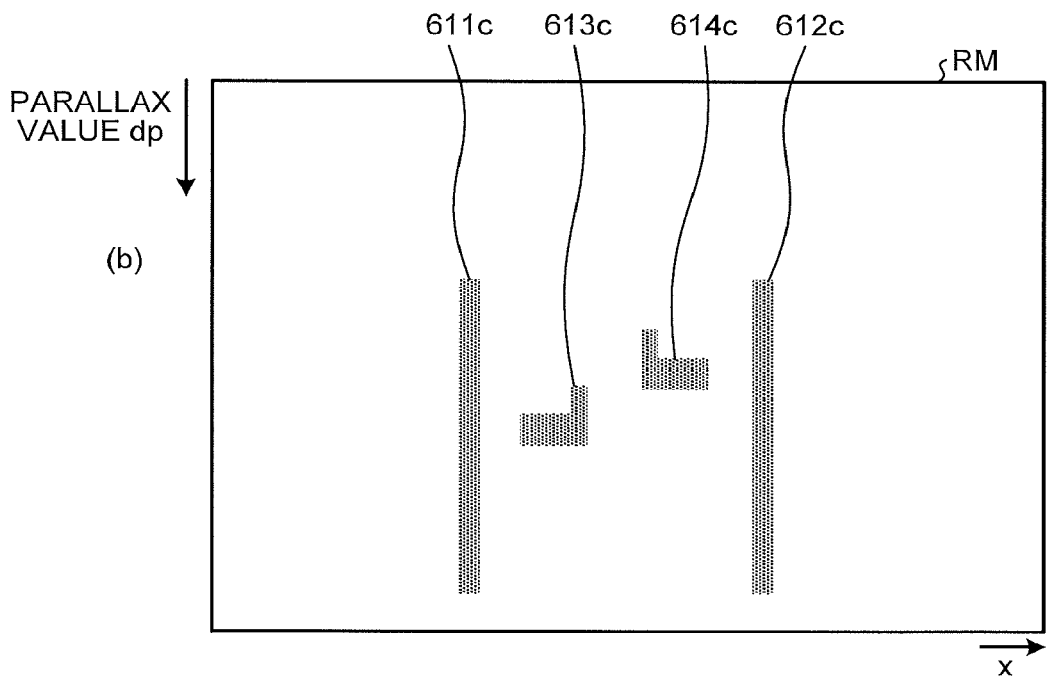
(b)

FIG.14
(a)
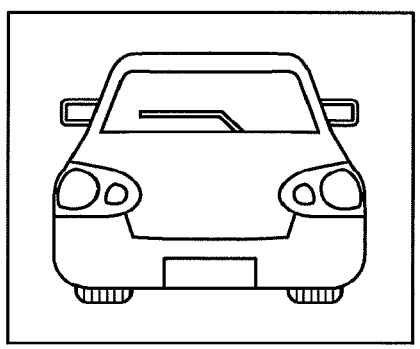
(b)
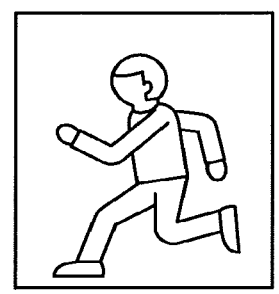
(c)
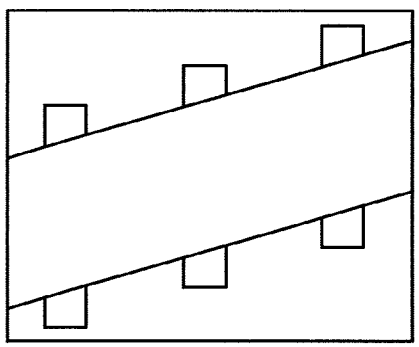

FIG.16
(a) 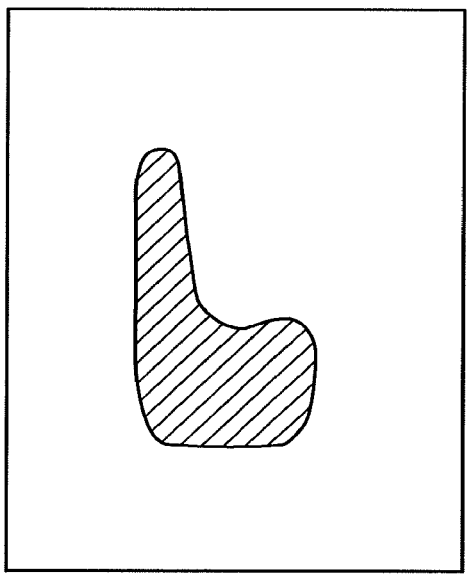
(b) 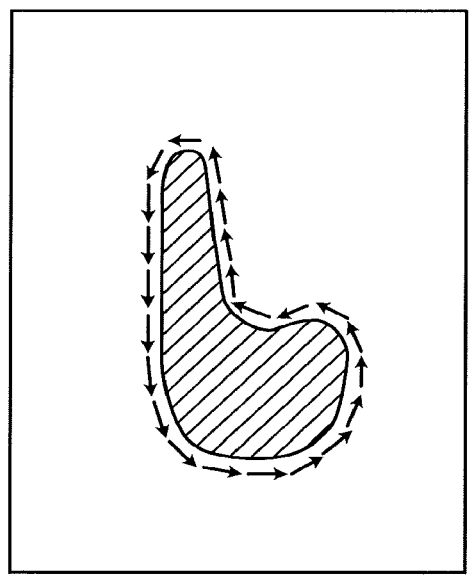

FIG.17
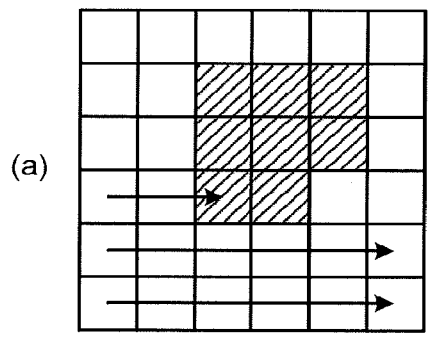
(a)
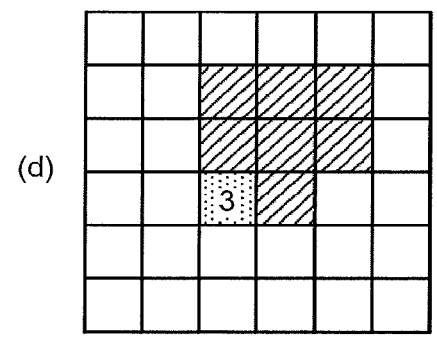
(d)
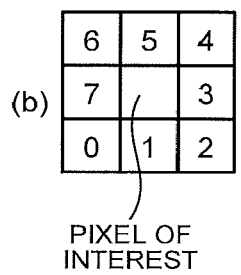
(b)
PIXEL OF INTEREST
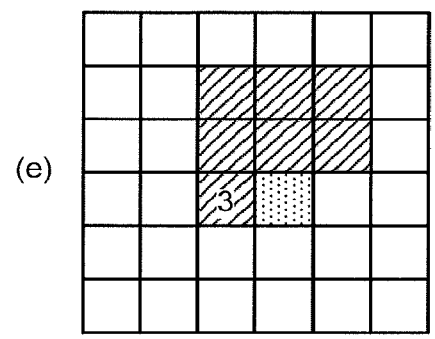
(e)
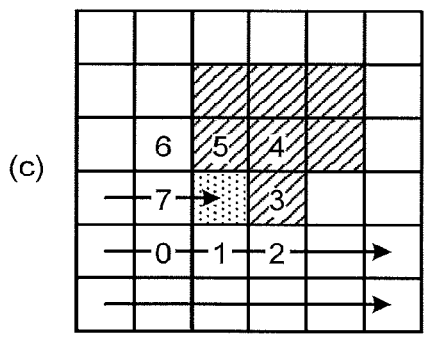
(c)
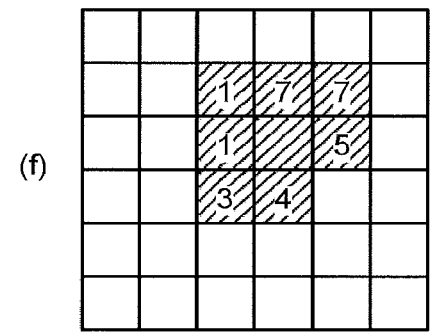
(f)

FIG.19
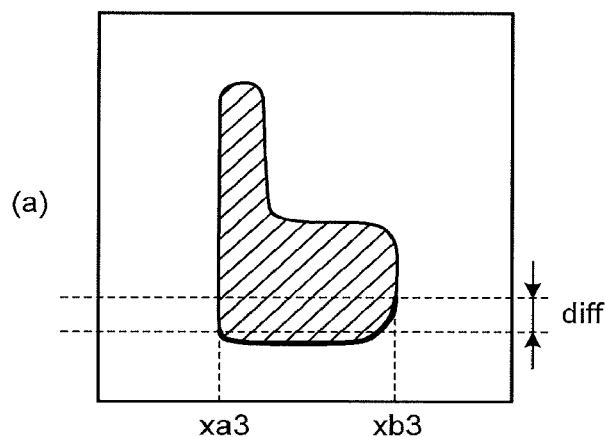
(a)
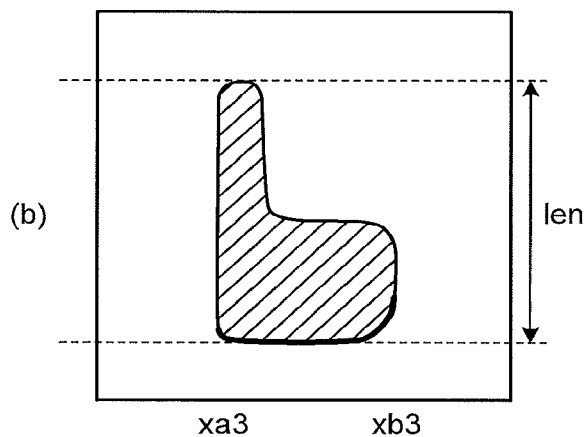
(b)
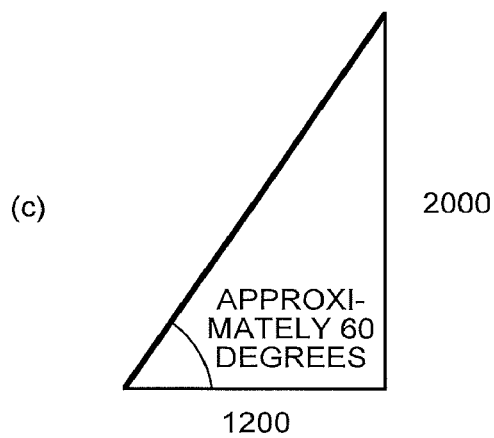
(c)

FIG.23
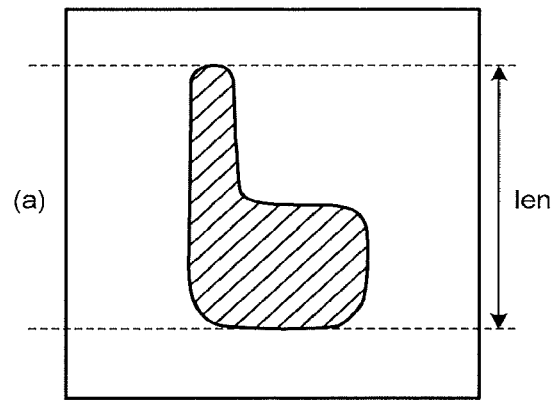
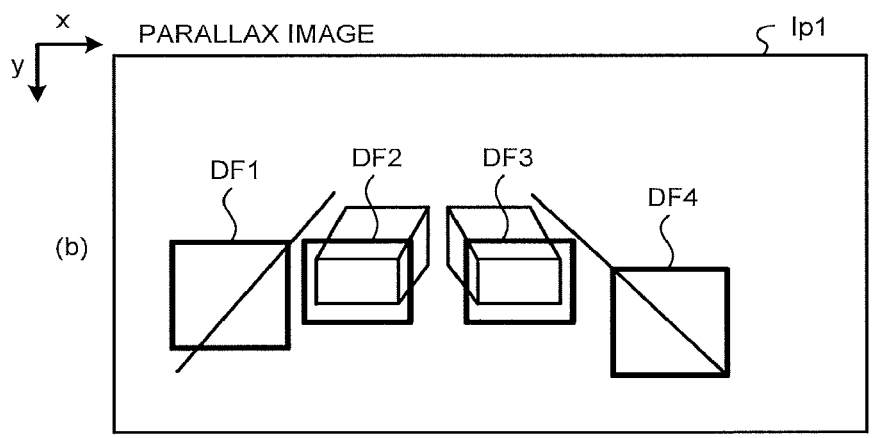
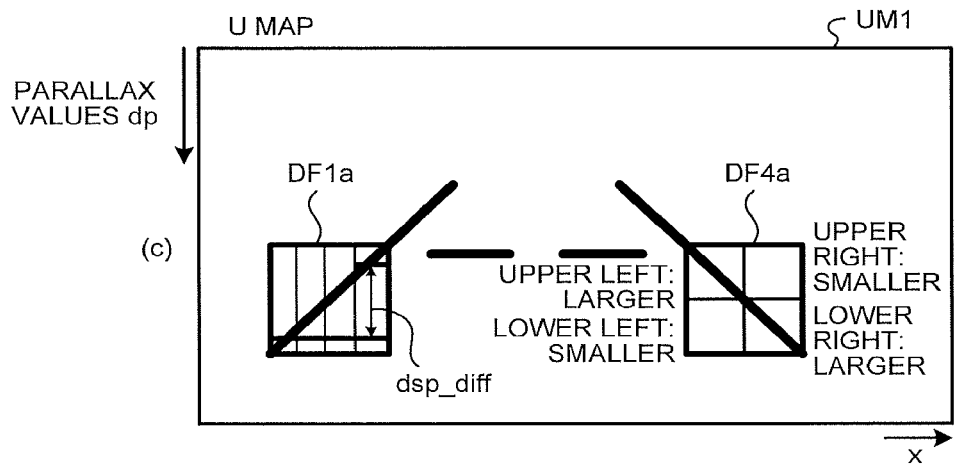

IMAGE PROCESSING APPARATUS, OBJECT RECOGNITION APPARATUS, EQUIPMENT CONTROL SYSTEM, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2016/075232 filed on Aug. 29, 2016 which designates the United States, incorporated herein by reference, and which claims the benefit of priority from Japanese Patent Applications No. 2015-233373, filed on Nov. 30, 2015, incorporated herein by reference.

BACKGROUND OF THE INVENTION

1. Field of the Invention

Embodiments relate to an image processing apparatus, an object recognition apparatus, an equipment control system, an image processing method, and a computer-readable recording medium.

2. Description of the Related Art

Conventionally, in the automobile safety, structures, such as an automobile body, have been developed from the viewpoint of protecting a pedestrian, or ensuring the safety of passengers when an automobile strikes a pedestrian. However, due to the recent advancement in the information processing technology and the image processing technology, some technologies for detecting persons and automobiles quickly have come to be developed. Such technologies are also applied in the development of automobiles that apply brakes automatically so that collisions are prevented proactively. Such automatic automobile control requires a correct measurement of a distance to an object such as a person or another vehicle. To achieve this end, a distance measurement using a millimeter-wave radar or a laser radar, and that using a stereo camera have also been put into practice.

When a stereo camera is used as a technology for recognizing objects, an object is recognized by generating a parallax image by deriving a parallax of each object included in luminance images captured by the stereo camera, and by grouping pixels having approximately the same parallax values. By extracting such a cluster of parallax values from the parallax image, the height, the width, and the depth of an object, and the three-dimensional position of the object can be detected. Although the type of the object (e.g., a vehicle, a guardrail, or a pedestrian) can be determined based on the size of the object recognized in such a manner, the size of the objects belonging to the same type varies depending on the orientation of the object, and such size variation makes it difficult to apply subsequent processing. For example, an object having a size of an ordinary passenger car may be recognized as having a size of a large-sized vehicle depending on the orientation. Therefore, it is important, in recognizing an object, to identify not only the size of the object, but also the orientation of the object (particularly, the orientation of a vehicle). To identify the orientation, a method for detecting a surface of the object has been available. For example, when the object to be recognized is a vehicle, the rear surface, which is the surface on the rear side, and the side surfaces are detected.

Disclosed as a technology for detecting a surface of a recognized object is a technology that calculates normal vectors from a depth image, that detects a region in which the orientations of the normal vectors are continuous as a surface, and that matches a feature value of the surface with a feature value of an image to be matched (See Japanese Patent Application Laid-open No. 2014-134856).

However, when the feature value of the image is to be matched, the technology disclosed in Japanese Patent Application Laid-open No. 2014-134856 requires the feature value to be matched with a feature value of an image to be matched that is stored in a database. Therefore, the processing load is increased, and it is difficult to ensure the real-timeliness.

In view of the above-mentioned conventional problem, there is a need to provide an image processing apparatus, an object recognition apparatus, an equipment control system, an image processing method, and a computer-readable recording medium having a program for improving the processing speed of the process of detecting a surface of a recognized object.

SUMMARY OF THE INVENTION

According to an embodiment, the present invention includes a first extracting unit, a second extracting unit, and a detecting unit. The first extracting unit is configured to extract a first region in which an object is represented, from a distance image that is drawn using distance information, based on the distance information of the object calculated from an image of the object captured by an image capturing unit. The second extracting unit is configured to extract a contour direction that is a direction along which pixels forming a contour of the first region are arrayed. The detecting unit is configured to detect a first surface facing the image capturing unit from the first region, based on the contour direction extracted by the second extracting unit.

BRIEF DESCRIPTION OF THE DRAWINGS

FIG. 1 is a schematic for explaining the principle by which the distance from the image capturing unit to an object is obtained;

FIG. 2 is a schematic for explaining how a corresponding pixel corresponding to a reference pixel of a reference image is found in a comparative image;

FIG. 4 is a schematic illustrating an example in which an equipment control system according to the embodiment is installed onboard a vehicle;

FIG. 12 is a schematic illustrating an example of a real U map generated from the U map;

FIG. 14 is a schematic illustrating an example of an object-recognized region corresponding to an extracted isolated region;

FIG. 16 is a schematic for generally explaining a process of extracting a contour from the isolated region;

FIG. 17 is a schematic for explaining the process of extracting a contour from the isolated region, in detail;

FIG. 19 is a schematic for explaining a process of determining whether the detected rear surface is valid;

FIG. 23 is a schematic for explaining a process of determining whether an object is a side surface object;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 3:
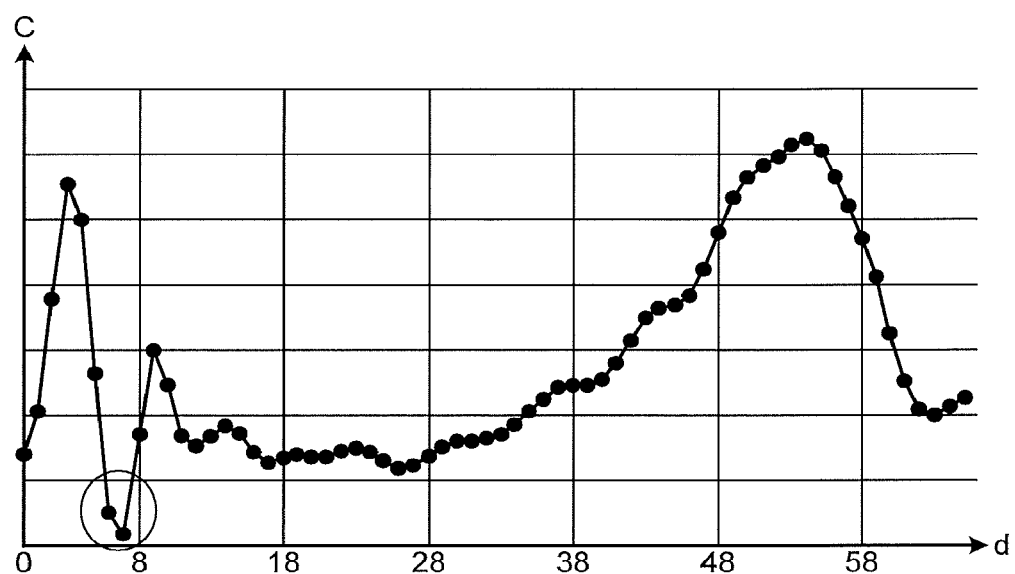
FIG. 3 is a schematic illustrating an example of a graph indicating a result of a block matching process.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Overview of Distance Measurement Method Using Block Matching Process

A distance measurement method using a block matching process will now be generally explained with reference to FIGS. 1 to 3.

Principle of Distance Measurement

FIG. 1 is a schematic for explaining the principle by which the distance from the image capturing unit to an object is obtained. Explained below, with reference to FIG. 1, is the principle by which a parallax of the object is derived from a stereo camera using a stereo matching process, and the distance from the stereo camera to the object is measured using a parallax value indicating the parallax will now be explained.

It is assumed herein that an image capturing system illustrated in FIG. 1 includes an image capturing unit $10a$ and an image capturing unit $10b$ that are arranged with their image planes matched with each other, with their horizontal axes positioned at the same level, and with their optical axes extending in parallel with each other. The image capturing units $10a$, $10b$ have imaging lenses $11a$, $11b$, respectively, each of which refracts incident light, and forms an image of an object on an image sensor that is a solid-state image sensor. The images captured by the image capturing unit $10a$ and the image capturing unit $10b$ are referred to as a reference image Ia (first captured image) and a comparative image Ib (second captured image), respectively. In FIG. 1, a point S of an object E, which is in a three-dimensional space, is mapped to the reference image Ia and the comparative image Ib at points on a line extending in parallel with the line connecting the imaging lens $11a$ and the imaging lens $11b$. The point S mapped to the reference image Ia is herein denoted as a point Sa(x, y), and the point S mapped to the comparative image Ib is denoted as a point Sb(X, y). At this time, a parallax value dp is expressed as following (Equation 1), using the point Sa(x, y) in the coordinate system of the reference image Ia, and the point Sb(X, y) in the coordinate system of the comparative image Ib.

$$dp = X - x \quad \text{(Equation 1)}$$

In FIG. 1, when Δa denotes a distance between the point Sa(x, y) and an intersecting point between a perpendicular line extended from the imaging lens $11a$ and the imaging surface of the reference image Ia, and Δb denotes a distance between the point Sb(X, y) and an intersecting point between a perpendicular line extended from the imaging lens $11b$ and the imaging surface of the comparative image Ib, the parallax value dp can also be expressed as dp=Δa+Δb.

A distance Z between the image capturing units $10a$, $10b$ and the object E is then derived using the parallax value dp. At this time, connecting the position of the focal point of the imaging lens $11a$ and the position of the focal point of the imaging lens $11b$ with a line, the distance Z represents the distance between this line and the point S of the object E. As illustrated in FIG. 1, the distance Z can be calculated with following (Equation 2), using the focal lengths f of the imaging lens $11a$ and the imaging lens $11b$, a baseline length B that is a length between the imaging lens $11a$ and the imaging lens $11b$, and the parallax value dp.

$$Z = (B \times f)/dp \quad \text{(Equation 2)}$$

Based on (Equation 2), it can be understood that the distance Z is shorter when the parallax value dp is larger, and the distance Z is greater when the parallax value dp is smaller.

Block Matching Process

A distance measurement method using a block matching process will now be explained, with reference to FIGS. 2 and 3.

FIG. 2 is a schematic for explaining how a corresponding pixel corresponding to a reference pixel of the reference image is found in the comparative image. FIG. 3 is a schematic illustrating an example of a graph indicating a result of a block matching process.

A method for calculating a cost C(p, d) will now be explained with reference to FIGS. 2 and 3. It is assumed, in the explanation hereunder, C(p, d) indicates C(x, y, d).

In FIG. 2, a section (a) is a conceptual diagram representing a reference pixel p and a reference region pb in the reference image Ia. A section (b) of FIG. 2 is a conceptual diagram how the cost C is calculated by shifting (moving) the position of a candidate for a corresponding pixel, corresponding to the reference pixel p illustrated in the section (a) of FIG. 2, across the comparative image Ib. The corresponding pixel is a pixel that is most similar to the reference pixel p of the reference image Ia, in the comparative image Ib. The cost C is an evaluation representing similarity or dissimilarity (a degree of match) of a pixel in the comparative image Ib to the reference pixel p in the reference image Ia. It is assumed herein that the cost C described below is an evaluation of dissimilarity indicating that a pixel of the comparative image Ib exhibits higher similarity to the reference pixel p when the pixel exhibits a lower cost.

As illustrated in the section (a) of FIG. 2, a cost C(p, d) is calculated for each of the candidate pixels q(x+d, y), which are candidates for the corresponding pixel corresponding to the reference pixel p(x, y) in the comparative image Ib, that are plotted along the epipolar line EL of the reference pixel p(x, y), based on the luminance (pixel value) of the reference pixel p(x, y) in the reference image Ia, and on the luminance (pixel value) of the candidate pixel q(x+d, y). d herein denotes the amount (offset) by which the candidate pixel q is shifted with respect to the reference pixel p, and the shift amount d is incremented in units of one pixel. In other words, the cost C(p, d) representing the dissimilarity between the luminance of the candidate pixel q(x+d, y) and the luminance of the reference pixel p(x, y) is calculated while shifting the candidate pixel q(x+d, y), by one pixel at a time, within a predetermined range (for example, 0<d<25). Furthermore, in the embodiment, a block matching (template matching) process is performed, as a stereo matching process for acquiring the corresponding pixel corresponding to the reference pixel p. In the block matching process, dissimilarity between a reference region pb and a candidate region qb is acquired. The reference region pb is a predetermined region of the reference image Ia having the reference pixel p at the center. The candidate region qb is a region having the candidate pixel q at the center (and having the same size as the reference region pb) in the comparative image Ib. Examples of the evaluation used as the cost C representing the dissimilarity between the reference region pb and the candidate region qb include a sum of absolute difference (SAD), a sum of squared difference (SSD), and a zero-mean-sum of squared difference (ZSSD), which is a value resultant of subtracting the average luminance taken across the blocks from the SSD. Because these evaluations take smaller values when the correlation (similarity) between the target regions is higher, these evaluations represent dissimilarity.

As mentioned earlier, the image capturing units 10a, 10b are arranged with their image planes matched with each other, with their horizontal axes positioned at the same level, and with their optical axes extending in parallel with each other. Therefore, the reference image Ia and the comparative image Ib also have their horizontal axes matched at the same level. Therefore, the corresponding pixel of the comparative image Ib, corresponding to the reference pixel p of the reference image Ia, is found on the epipolar line EL illustrated as a horizontal line, viewing from a direction of the paper surface in FIG. 2. Hence, in order to acquire the corresponding pixel in the comparative image Ib, the pixels on the epipolar line EL in the comparative image Ib may be searched.

A relation of the cost C(p, d) calculated from the block matching process with respect to the shift amount d is expressed as a graph illustrated in FIG. 3, for example. In the example illustrated in FIG. 3, because the cost C is smallest when the shift amount d=7, the parallax value dp is derived as 7.

An image processing apparatus, an object recognition apparatus, an equipment control system, an image processing method, and a computer program according to one embodiment of the present invention will now be explained in detail with reference to FIGS. 4 to 25. The embodiment described below is, however, not intended to limit the scope of the present invention in any way, and the elements described in the embodiment include those that can be easily thought of by those skilled in the art, those that are substantially the same, and those falling within what is called a range of equivalency. Furthermore, various omissions, replacements, and combinations are still possible within the scope not deviating from the essence of the embodiment described below.

EMBODIMENT

The embodiment will now be explained specifically using FIGS. 4 to 25. Explained herein is an example in which an object recognition apparatus 1 that performs the block matching process is installed onboard an automobile.

General Configuration of Vehicle Provided with Object Recognition Apparatus

FIG. 4 is a schematic illustrating an example in which an equipment control system according to the embodiment is installed onboard a vehicle. A vehicle 70 in which an equipment control system 60 according to the embodiment is installed onboard will now be explained with reference to FIG. 4. In FIG. 4, a section (a) is a side view of the vehicle 70 in which the equipment control system 60 is installed onboard, and a section (b) is a front view of the vehicle 70.

As illustrated in FIG. 4, the vehicle 70 that is an automobile has the equipment control system 60 onboard. The equipment control system 60 includes an object recognition apparatus 1 that is installed inside of a cabin that is a passenger compartment of the vehicle 70, a vehicle control apparatus 6 (control apparatus), a steering wheel 7, and a brake pedal 8.

The object recognition apparatus 1 has an image capturing function for capturing images in a travelling direction of the vehicle 70, and is installed near a rearview mirror on an interior side of the windshield of the vehicle 70, for example. The object recognition apparatus 1 includes a main unit 2, and an image capturing unit 10a and an image capturing unit 10b that are fixed to the main unit 2. A configuration and an operation of the object recognition apparatus 1 will be described later in detail. The image capturing units 10a, 10b are fixed to the main unit 2 in such a manner that images of a subject in the travelling direction of the vehicle 70 are captured.

The vehicle control apparatus 6 is an electronic control unit (ECU) that executes various vehicle control based on recognition information received from the object recognition apparatus 1. As some examples of the vehicle control, the vehicle control apparatus 6 performs steering control for avoiding obstacles by controlling the steering system including the steering wheel 7 (target of control), and braking control for decelerating and stopping the vehicle 70 by controlling the brake pedal 8 (target of control), based on the recognition information received from the object recognition apparatus 1.

By causing the equipment control system 60, including such object recognition apparatus 1 and vehicle control apparatus 6, to perform vehicle control such as the steering control and the braking control, the driving safety of the vehicle 70 can be improved.

It is assumed herein that the object recognition apparatus 1 captures images in front of the vehicle 70, as mentioned above, but the present invention is not limited thereto. In other words, the object recognition apparatus 1 may be installed in such a manner that an image of the rear side or a lateral side of the vehicle 70 is captured. With such a configuration, the object recognition apparatus 1 can detect the position of a following vehicle or a person behind the vehicle 70, or the position of another vehicle or a person on the lateral side. The vehicle control apparatus 6 can then sense a danger before the vehicle 70 changes a lane or merges into another lane, for example, and executes the vehicle control described above. Furthermore, as another example, when the vehicle 70 is moved in reverse to park, and the vehicle control apparatus 6 determines that there is a chance of the vehicle 70 colliding with an obstacle based on the recognition information that is related to obstacles on the rear side of the vehicle 70, and output from the object recognition apparatus 1, the vehicle control apparatus 6 can execute the vehicle control described above.

Configuration of Object Recognition Apparatus

Figure 5:
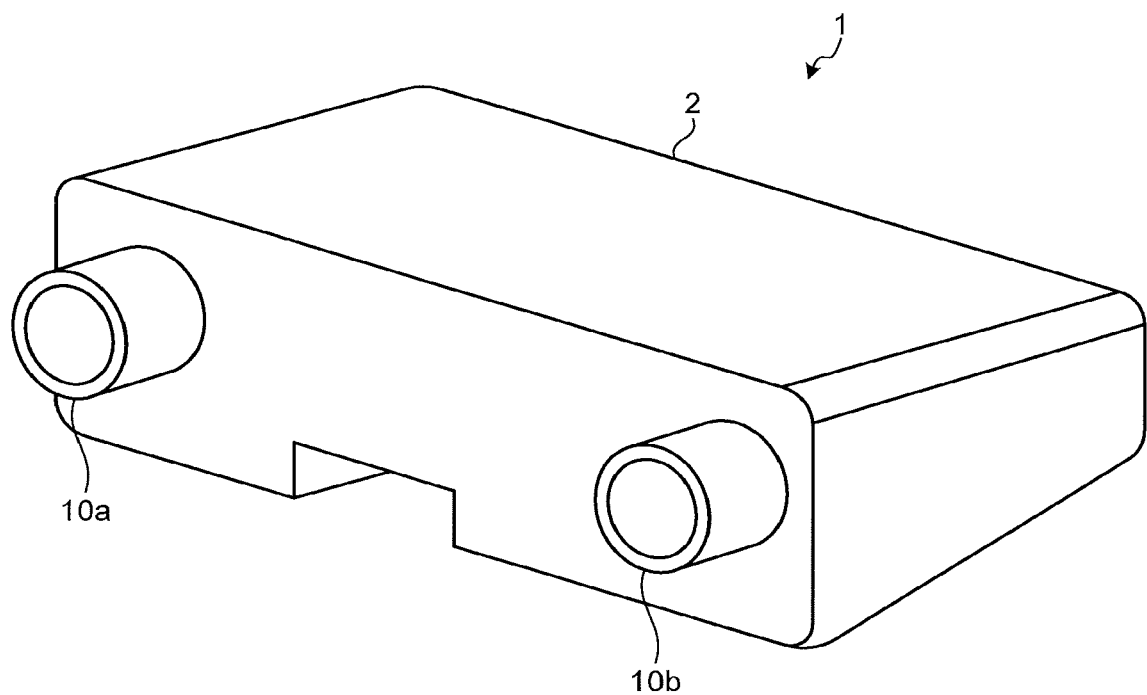
FIG. 5 is a schematic illustrating an example of an external view of an object recognition apparatus according to the embodiment.

FIG. 5 is a schematic illustrating an example of an external view of the object recognition apparatus according to the embodiment. As illustrated in FIG. 5, the object recognition apparatus 1 includes the main unit 2, and the image capturing unit 10a and the image capturing unit 10b that are fixed to the main unit 2, as mentioned earlier. The image capturing units 10a, 10b are provided as a pair of cylindrical cameras that are arranged with their image planes matched with each other, with their horizontal axes positioned at the same level, and with their optical axes extending in parallel with each other, on the main unit 2. For the convenience of explanation, the image capturing unit 10a illustrated in FIG. 5 will be sometimes referred to as a "right" camera, and the image capturing unit 10b will be sometimes referred to as a "left" camera.

Hardware Configuration of Object Recognition Apparatus

Figure 6:
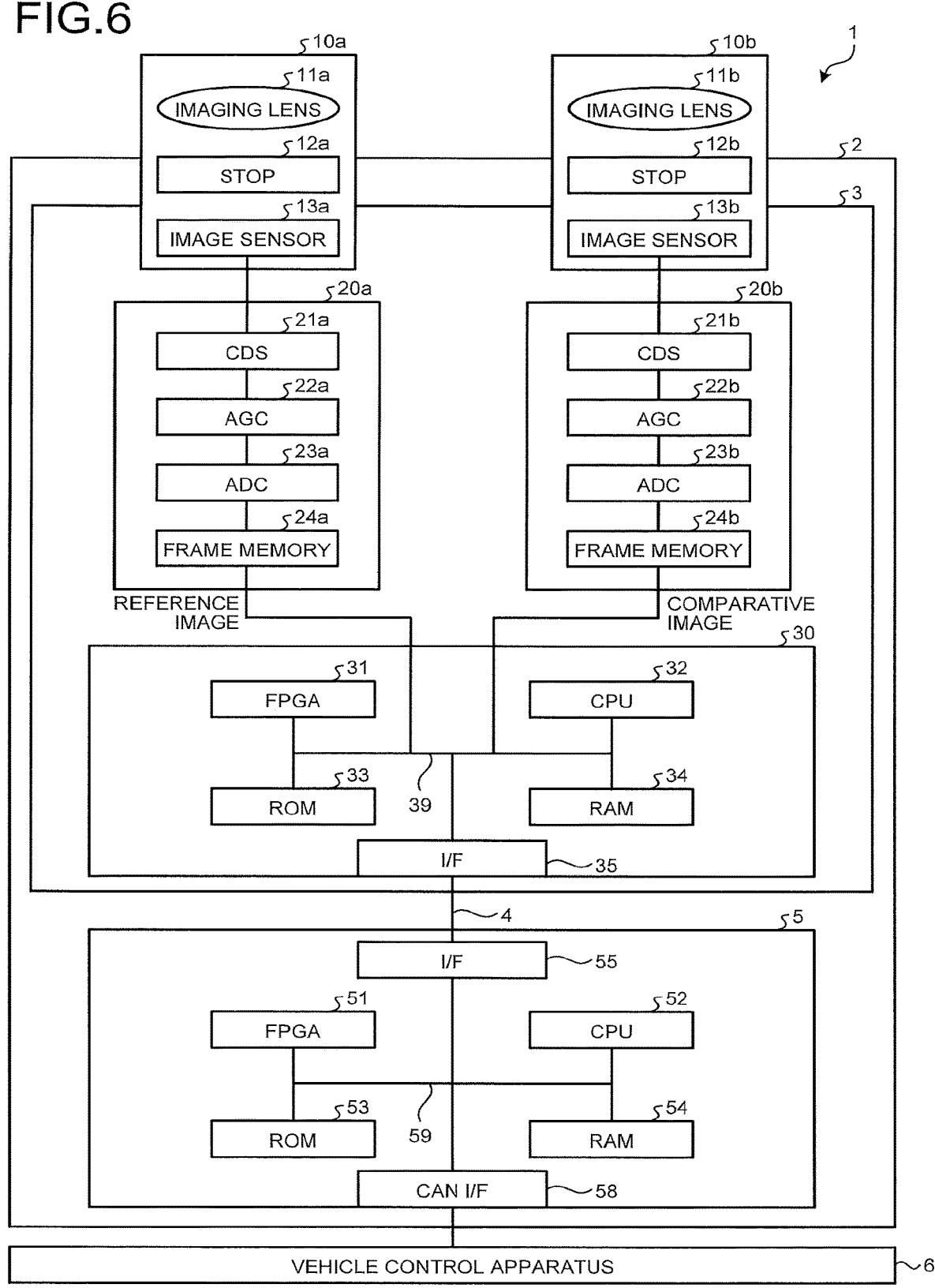
FIG. 6 is a schematic illustrating an example of a hardware configuration of the object recognition apparatus according to the embodiment.

FIG. 6 is a schematic illustrating an example of a hardware configuration of the object recognition apparatus according to the embodiment. The hardware configuration of the object recognition apparatus 1 will now be explained with reference to FIG. 6.

As illustrated in FIG. 6, the object recognition apparatus 1 includes a parallax value deriving unit 3 and a recognition processing unit 5 that are provided inside of the main unit 2.

The parallax value deriving unit 3 derives a parallax value dp representing a parallax of the object E, from a plurality of images resultant of capturing images of the object E, and outputs a parallax image each pixel of which represents a parallax value dp. The recognition processing unit 5 performs processes such as an object recognition process to recognize objects such as a person or a car included in the captured image based on the parallax image output from the parallax value deriving unit 3, and outputs recognition information that is information indicating the result of the object recognition process to the vehicle control apparatus 6.

As illustrated in FIG. 6, the parallax value deriving unit 3 includes the image capturing unit 10a, the image capturing unit 10b, a signal conversion unit 20a, a signal conversion unit 20b, and an image processing unit 30.

The image capturing unit 10a is a processing unit that captures an image of the subject on the front side, and that generates an analog image signal. The image capturing unit 10a includes an imaging lens 11a, a stop 12a, and an image sensor 13a.

The imaging lens 11a is an optical element via which incident light is refracted, and that forms an image of the object on the image sensor 13a. The stop 12a is a member that adjusts the amount of incident light on the image sensor 13a, by shielding a part of the light having passed through the imaging lens 11a. The image sensor 13a is a semiconductor device that converts the light having been incident on the imaging lens 11a and having passed through the stop 12a into an electrical analog image signal. The image sensor 13a is implemented as a solid-state image sensor such as a charge-coupled device (CCD) or a complementary metal-oxide-semiconductor (CMOS).

The image capturing unit 10b is a processing unit that captures an image of the subject on the front side, and that generates an analog image signal. The image capturing unit 10b includes an imaging lens 11b, a stop 12b, and an image sensor 13b. The functions of the imaging lens 11b, the stop 12b, and the image sensor 13b are the same as those of the imaging lens 11a, the stop 12a, and the image sensor 13a, respectively. The imaging lens 11a and the imaging lens 11b are installed in such a manner that the lens surfaces thereof are positioned on the same plane so that the left camera and the right camera capture the image under the same conditions.

The signal conversion unit 20a is a processing unit that converts the analog image signal generated by the image capturing unit 10a into image data in a digital format. The signal conversion unit 20a includes a correlated double sampling (CDS) 21a, an automatic gain control (AGC) 22a, an analog-to-digital converter (ADC) 23a, and a frame memory 24a.

The CDS 21a removes noise from the analog image signal generated by the image sensor 13a by applying, for example, correlated double sampling, applying a differential filter in the horizontal direction, or applying a smoothing filter in the vertical direction. The AGC 22a performs gain control for controlling the intensity of the analog image signal having noise removed by the CDS 21a. The ADC 23a converts the analog image signal having gain-controlled by the AGC 22a into image data in a digital format. The frame memory 24a stores therein the image data resultant of the conversion performed by the ADC 23a.

The signal conversion unit 20b is a processing unit that converts the analog image signal generated by the image capturing unit 10b into image data in a digital format. The signal conversion unit 20b includes a CDS 21b, an AGC 22b, an ADC 23b, and a frame memory 24b. The functions of the CDS 21b, the AGC 22b, the ADC 23b, and the frame memory 24b are the same as those of the CDS 21a, the AGC 22a, the ADC 23a, and the frame memory 24a, respectively, that are described above.

The image processing unit 30 is a device that applies image processing to the image data resultant of the conversions performed by the signal conversion unit 20a and the signal conversion unit 20b. The image processing unit 30 includes a field programmable gate array (FPGA) 31, a central processing unit (CPU) 32, a read-only memory (ROM) 33, a random access memory (RAM) 34, an interface (I/F) 35, and a bus line 39.

The FPGA 31 is an integrated circuit, and performs, in this example, the process for deriving a parallax value dp in the images that are based on the image data. The CPU 32 controls the functions of the parallax value deriving unit 3. The ROM 33 stores therein an image processing program executed by the CPU 32 to control the functions of the parallax value deriving unit 3. The RAM 34 is used as a working area of the CPU 32. The I/F 35 is an interface for communicating with the I/F 55 included in the recognition processing unit 5, via a communication line 4. The bus line 39 is an address bus or a data bus, for example, that connects the FPGA 31, the CPU 32, the ROM 33, the RAM 34, and the I/F 35 in a manner enabled to communicate with each other, as illustrated in FIG. 6.

The image processing unit 30 is explained to be provided with the FPGA 31, as an integrated circuit for deriving the parallax value dp, but the embodiment is not limited thereto. For example, the integrated circuit may be another integrated circuit such as an application-specific integrated circuit (ASIC).

As illustrated in FIG. 6, the recognition processing unit 5 includes an FPGA 51, a CPU 52, a ROM 53, a RAM 54, an I/F 55, a controller area network (CAN) I/F 58, and a bus line 59.

The FPGA 51 is an integrated circuit, and performs, in this example, the object recognition process to the objects, based on the parallax image received from the image processing unit 30. The CPU 52 controls the functions of the recognition processing unit 5. The ROM 53 stores therein an object-recognition program for causing the CPU 52 to execute the object recognition process corresponding to the recognition processing unit 5. The RAM 54 is used as a working area of the CPU 52. The I/F 55 is an interface for communicating data with the I/F 35 included in the image processing unit 30, via the communication line 4. The CAN I/F 58 is an interface for communicating with external controllers (such as the vehicle control apparatus 6 illustrated in FIG. 6), and is connected to the CAN of an automobile, for example. The bus line 59 is an address bus or a data bus, for example, that connects the FPGA 51, the CPU 52, the ROM 53, the RAM 54, the I/F 55, and the CAN I/F 58 in a manner enabled to communicate with each other, as illustrated in FIG. 6.

With such a configuration, when the recognition processing unit 5 receives a parallax image from the I/F 35 included in the image processing unit 30 via the communication line 4, the FPGA 51 performs processes such as the object recognition process for detecting objects, such as a person or a car, included in the captured image, based on the parallax image, in response to an instruction of the CPU 52 included in the recognition processing unit 5.

Each of the computer programs described above may be recorded and distributed in a computer-readable recording medium, as a file in an installable or executable format. Examples of the recording medium include a compact-disc read-only memory (CD-ROM) and a Secure Digital (SD) memory card.

Functional Block Configuration and Operation of Object Recognition Apparatus

Figure 7:
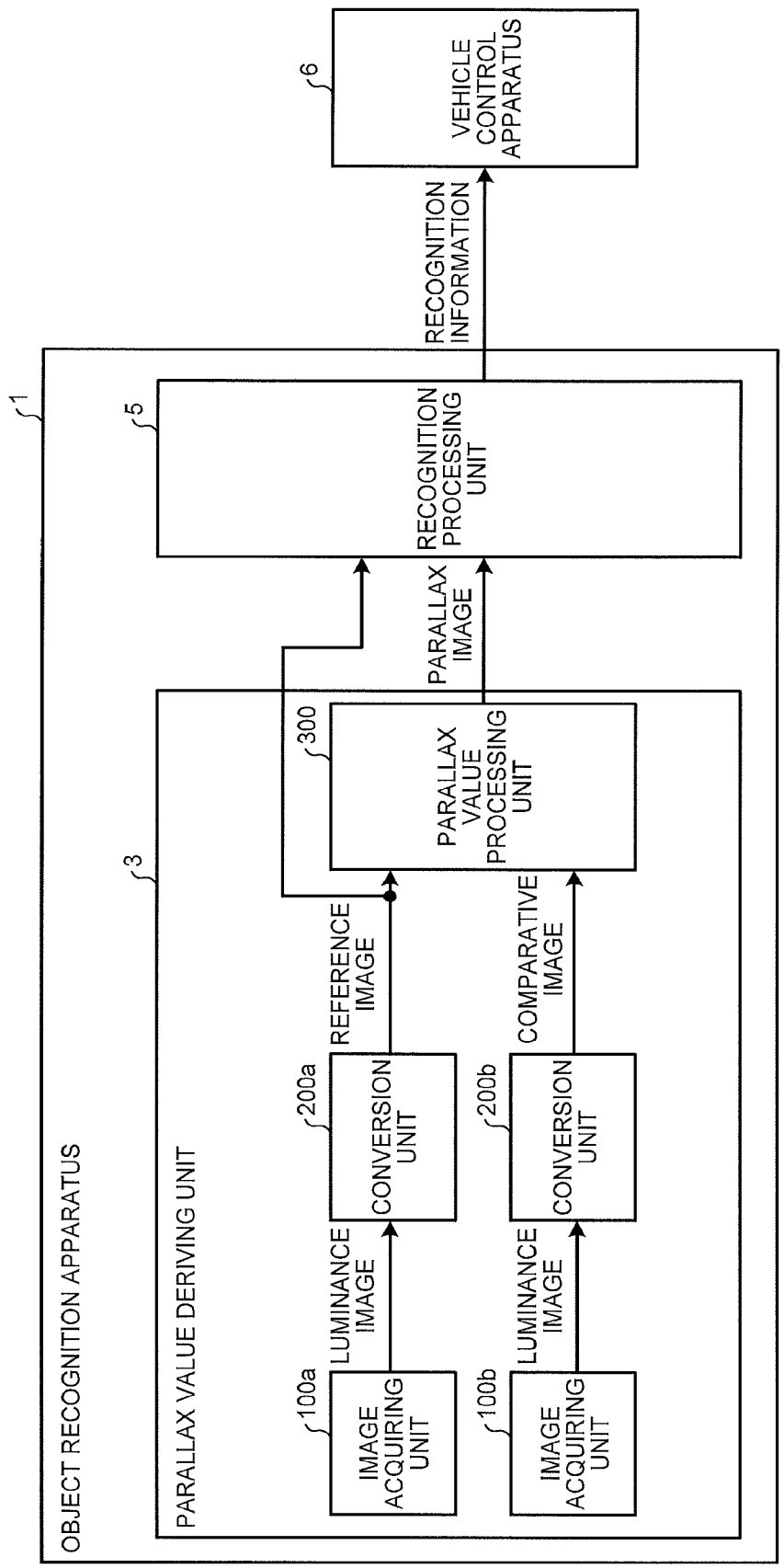
FIG. 7 is a schematic illustrating an example of a functional block configuration of the object recognition apparatus according to the embodiment.

FIG. 7 is a schematic illustrating an example of a functional block configuration of the object recognition apparatus according to the embodiment. To begin with, the functional block configuration and the operation of the relevant portion of the object recognition apparatus 1 will be explained with reference to FIG. 7.

As explained earlier with reference to FIG. 6, the object recognition apparatus 1 includes the parallax value deriving unit 3 and the recognition processing unit 5, as illustrated in FIG. 7. The parallax value deriving unit 3 includes an image acquiring unit 100a (first image capturing unit), an image acquiring unit 100b (second image capturing unit), conversion units 200a, 200b, and a parallax value processing unit 300.

The image acquiring unit 100a is a functional unit that causes the right camera to capture an image of the subject on the front side, that generates an analog image signal, and that acquires a luminance image that is an image based on the image signal. The image acquiring unit 100a is implemented by the image capturing unit 10a illustrated in FIG. 6.

The image acquiring unit 100b is a functional unit that causes the left camera to capture an image of the subject on the front side, that generates an analog image signal, and that acquires a luminance image that is an image that is based on the image signal. The image acquiring unit 100b is implemented by the image capturing unit 10b illustrated in FIG. 6.

The conversion unit 200a is a functional unit that removes noise from the image data representing the luminance image acquired by the image acquiring unit 100a, and that converts the resultant image data to image data in a digital format. The conversion unit 200a is implemented by the signal conversion unit 20a illustrated in FIG. 6.

The conversion unit 200b is a functional unit that removes noise from the image data representing the luminance image acquired by the image acquiring unit 100b, and that converts the resultant image data to image data in a digital format. The conversion unit 200b is implemented by the signal conversion unit 20b illustrated in FIG. 6.

Among the pieces of image data representing the two luminance images that are output from the conversion units 200a, 200b (hereinafter, simply referred to as luminance images), the luminance image captured by the image acquiring unit 100a, which is the right camera (the image capturing unit 10a), is established as image data of the reference image Ia (hereinafter, simply referred to as a reference image Ia), and the luminance image captured by the image acquiring unit 100b, which is the left camera (the image capturing unit 10b), is established as image data of the comparative image Ib (hereinafter, simply referred to as a comparative image Ib). In other words, the conversion units 200a, 200b output the reference image Ia and the comparative image Ib, respectively, based on the two luminance images that are output from the image acquiring units 100a, 100b, respectively.

Figure 8:
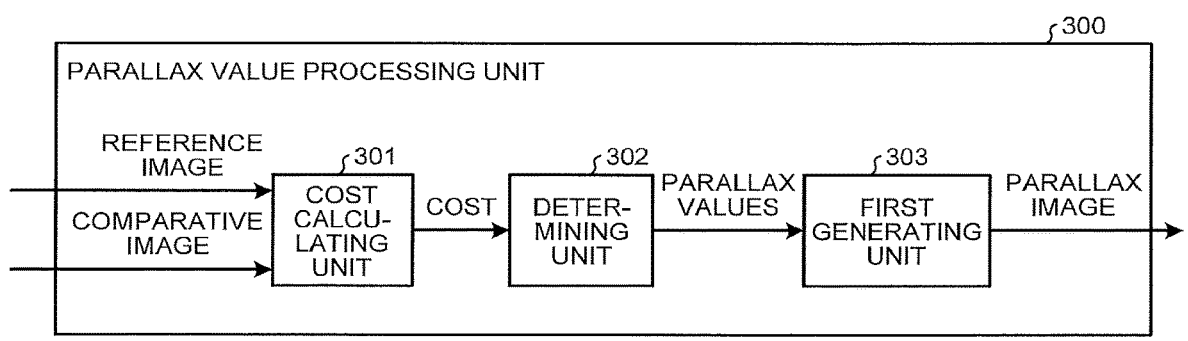
FIG. 8 is a schematic illustrating an example of a functional block configuration of a parallax value processing unit included in the object recognition apparatus according to the embodiment.

FIG. 8 is a schematic illustrating an example of a functional block configuration of a parallax value processing unit included in the object recognition apparatus according to the embodiment. The functional block configuration and an operation of this parallax value processing unit 300 will now be explained with reference to FIG. 8.

The parallax value processing unit 300 is a functional unit that derives a parallax value for each pixel of the reference image Ia, based on the reference image Ia and the comparative image Ib received from the conversion units 200a, 200b, respectively, and that generates a parallax image that is a map of a parallax value mapped to each pixel of the reference image Ia. The parallax value processing unit 300 outputs the generated parallax image to the recognition processing unit 5. As illustrated in FIG. 8, the parallax value processing unit 300 includes a cost calculating unit 301, a determining unit 302, and a first generating unit 303 (third generating unit).

The cost calculating unit 301 is a functional unit that calculates a cost $C(p, d)$ of each of the candidate pixels q(x+d, y) based on the luminance of the reference pixel p(x, y) in the reference image Ia, and the luminance of the candidate pixel q(x+d, y) in the comparative image Ib. The candidate pixel is a candidate for the corresponding pixel, and is identified by shifting the shift amount d from the position of the pixel corresponding to the position of the reference pixel p(x, y) in the comparative image Ib, along the epipolar line EL that is based on the reference pixel p(x, y). Specifically, the cost calculating unit 301 calculates dissimilarity between the reference region pb that is a predetermined region having the reference pixel p at the center in the reference image Ia, and the candidate region qb having the candidate pixel q at the center in the comparative image Ib (and having the same size as the reference region pb), as the cost C, through the block matching process.

The determining unit 302 is a functional unit that determines the shift amount d corresponding to the minimum cost C calculated by the cost calculating unit 301, as the parallax value dp in a pixel of the reference image Ia for which the cost C is calculated.

The first generating unit 303 is a functional unit that generates a parallax image that is an image resultant of replacing the pixel value at each pixel of the reference image Ia with a parallax value dp corresponding to that pixel, based on the parallax value dp determined by the determining unit 302.

The cost calculating unit 301, the determining unit 302, and the first generating unit 303 illustrated in FIG. 8 are implemented by the FPGA 31 illustrated in FIG. 6. The cost calculating unit 301, the determining unit 302, and the first generating unit 303 may also be implemented by, partly or entirely, causing the CPU 32 to execute a computer program stored in the ROM 33, instead of the FPGA 31 that is a hardware circuit.

The cost calculating unit 301, the determining unit 302, and the first generating unit 303 included in the parallax value processing unit 300 illustrated in FIG. 8 are merely conceptual representations of the functions, and are not limited to such a configuration. For example, the functional units illustrated as independent functional units of the parallax value processing unit 300 in FIG. 8 may be configured as one functional unit. The function achieved by one functional unit in the parallax value processing unit 300 illustrated in FIG. 8 may also be divided into a plurality of units, and implemented as a plurality of functional units.

Figure 9:
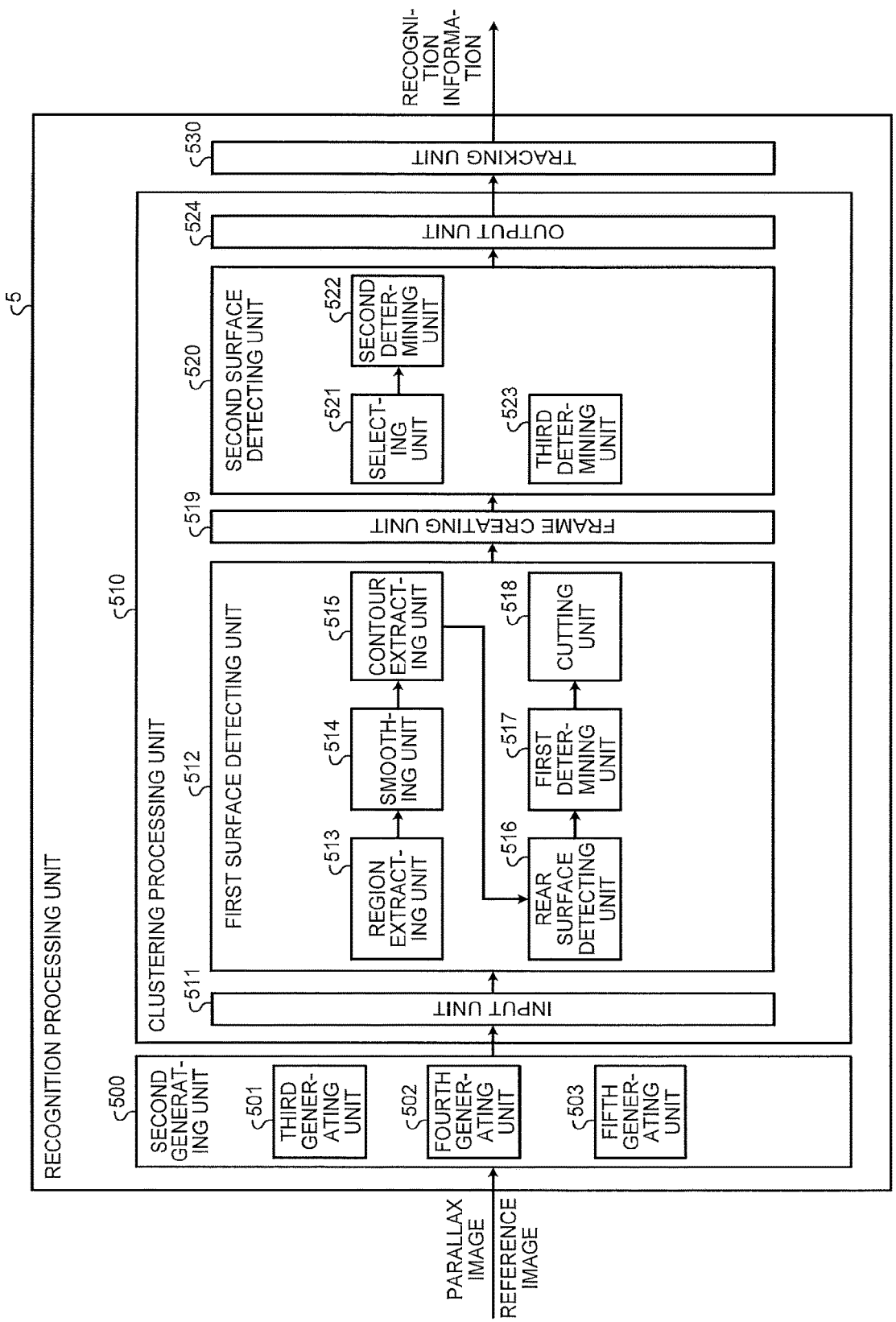
FIG. 9 is a schematic illustrating an example of a functional block configuration of a recognition processing unit included in the object recognition apparatus according to the embodiment.

FIG. 9 is a schematic illustrating an example of a functional block configuration of the recognition processing unit included in the object recognition apparatus according to the embodiment. The functional block configuration and an operation of the recognition processing unit 5 will now be explained with reference to FIG. 9.

As illustrated in FIG. 9, the recognition processing unit 5 includes a second generating unit 500, a clustering processing unit 510, and a tracking unit 530.

The second generating unit 500 is a functional unit that receives the parallax image from the parallax value processing unit 300, that receives the reference image Ia from the parallax value deriving unit 3, and that generates maps such as a V-disparity map, a U-disparity map, and a real U-disparity map. These maps will be described later in detail. A specific configuration and an operation of the second generating unit 500 will also be described later. The image received from the parallax value deriving unit 3 is not limited to the reference image Ia, but may also be the comparative image Ib.

The clustering processing unit 510 is a functional unit that recognizes an object included in the parallax image based on the maps received from the second generating unit 500, and that detects the surfaces of the object (a vehicle, in particular). As illustrated in FIG. 9, the clustering processing unit 510 includes an input unit 511, a first surface detecting unit 512, a frame creating unit 519, a second surface detecting unit 520, and an output unit 524. A specific operation of the clustering processing unit 510 will be described later.

The tracking unit 530 is a functional unit that executes a tracking process for rejecting the object or tracking the object, based on recognized region information that is information related to the object recognized by the clustering processing unit 510. Rejecting herein means a process of removing the object from the scope of subsequent processes (e.g., the tracking process). The recognized region information represents information related to the object recognized by the clustering processing unit 510, and includes information such as the position and the size of the recognized object in the V-disparity map, the U-disparity map, and the real U-disparity map, for example, an identification number assigned in a labelling process which is described later, and information such as a flag for rejection mentioned above. For example, the tracking unit 530 includes the result of rejecting the object recognized by the clustering processing unit 510 (rejection flag) in the recognized region information.

The "image processing apparatus" according to the present invention may be the clustering processing unit 510, or may be the recognition processing unit 5 including the clustering processing unit 510. Furthermore, in the embodiment, a parallax image is used as an example of a distance image, because parallax values can be handled as equivalent of distance values, but the embodiment is not limited thereto. For example, a distance image may be generated by fusing distance information from a millimeter-wave radar or a laser radar with a parallax image generated using a stereo camera. The distance image and the parallax image are both examples of the distance information.

Figure 10:
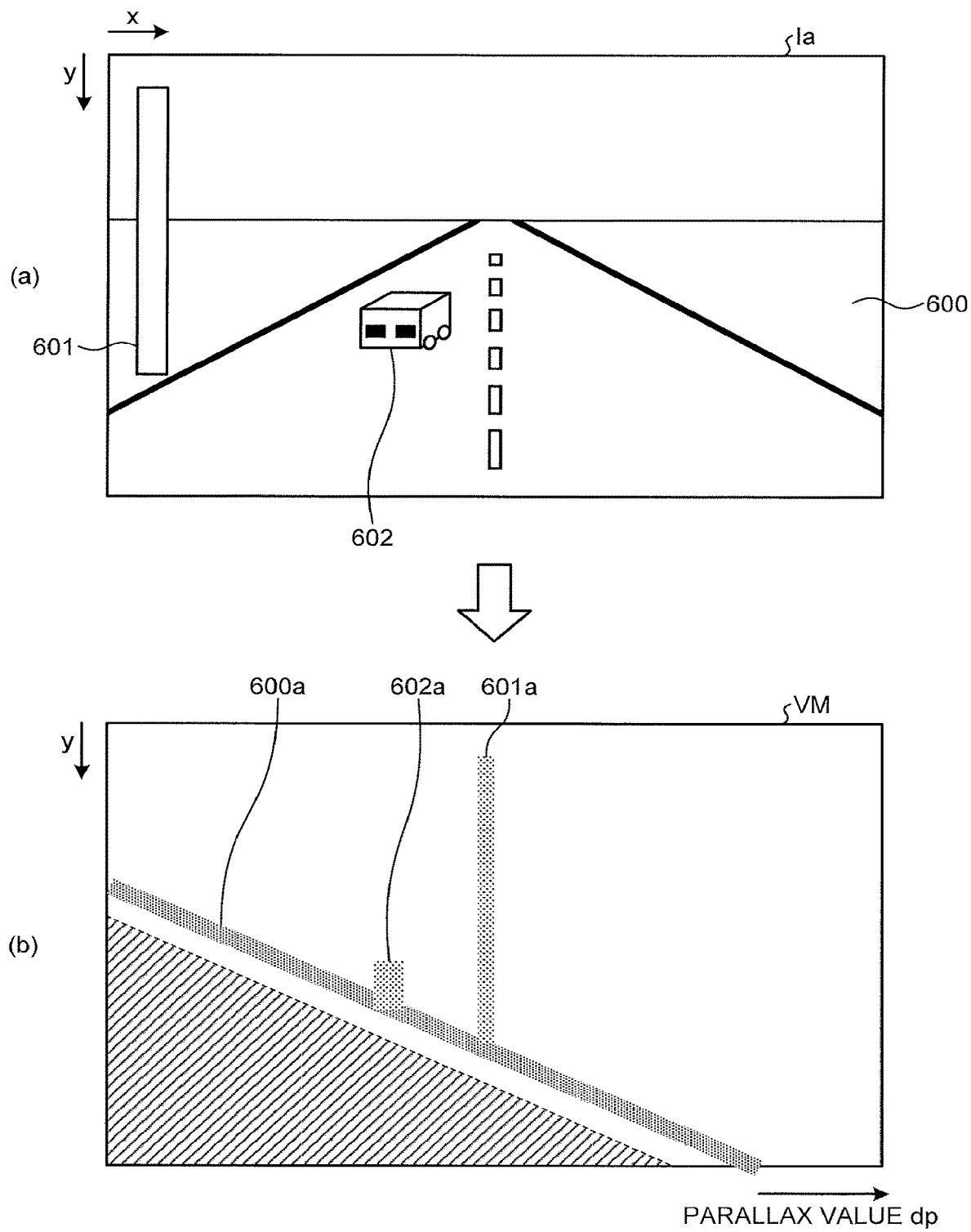
FIG. 10 is a schematic illustrating an example of a V map generated from a parallax image.
Figure 11:
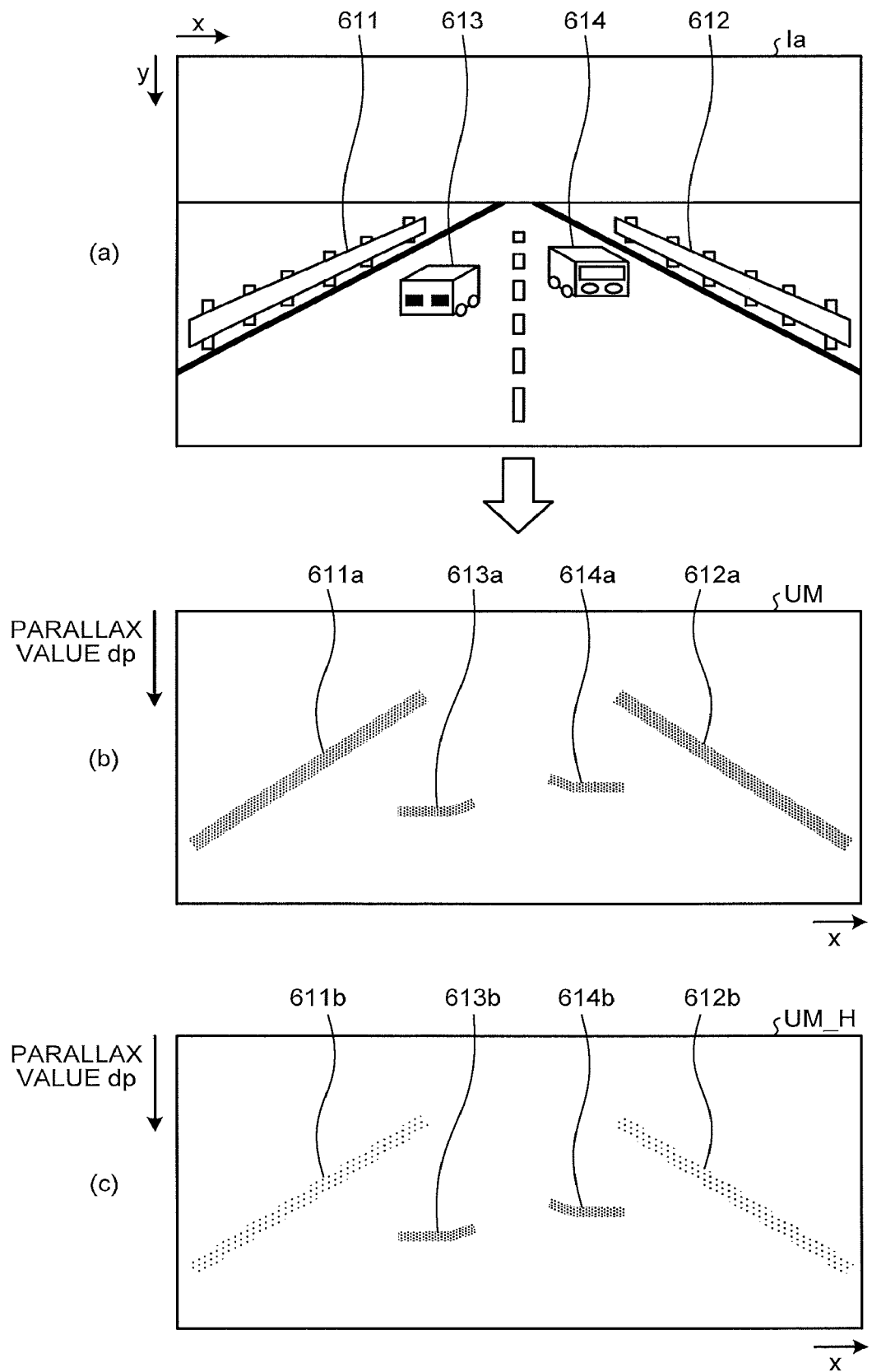
FIG. 11 is a schematic illustrating an example of a U map generated from the parallax image.

FIG. 10 is a schematic illustrating an example of the V map generated from the parallax image. FIG. 11 is a schematic illustrating an example of the U map generated from the parallax image. FIG. 12 is a schematic illustrating an example of the real U map generated from the U map. A configuration and an operation of the second generating unit 500 included in the recognition processing unit 5 will now be explained with reference to FIGS. 9 to 12.

As illustrated in FIG. 9, the second generating unit 500 includes a third generating unit 501, a fourth generating unit 502 (second generating unit), and a fifth generating unit 503 (first generating unit).

The third generating unit 501 is a functional unit that generates a V map VM that is a V-disparity map illustrated in a section (b) of FIG. 10 to detect a road surface from the parallax image received from the parallax value processing unit 300. The V-disparity map herein is a two-dimensional histogram representing a frequency distribution of parallax values dp, with the vertical axis thereof representing the y axis of the reference image Ia, and with the horizontal axis thereof representing a parallax value dp in the parallax image (or a distance). For example, a road surface 600, a telephone pole 601, and a car 602 are included in the reference image Ia illustrated in a section (a) of FIG. 10. The road surface 600 in the reference image Ia corresponds to a road surface portion 600a in the V map VM, the telephone pole 601 corresponds to a telephone pole portion 601a, and the car 602 corresponds to a car portion 602a.

The third generating unit 501 linearly approximates the position that is presumably to be a road surface from the generated V map VM. When the road surface is flat, the road surface can be approximated as one line. However, when the road surface has varying slopes, it is necessary to divide the V map VM into sections, and to take accurate linear approximations. As the linear approximation, Hough transform or least-square method, for example, both of which are known technologies, may be used. In the V map VM, the telephone pole portion 601a and the car portion 602a that are clusters positioned above the detected road surface portion 600a correspond to the telephone pole 601 and the car 602, respectively, that are objects on the road surface 600. When the fourth generating unit 502, which will be described later, generates the U-disparity map, the fourth generating unit 502 uses only the information above the road surface to remove noise.

The fourth generating unit 502 is a functional unit that generates a U map UM (second frequency image) that is the U-disparity map illustrated in a section (b) of FIG. 11 to recognize objects, using only the information that is positioned above the road surface detected from the V map VM, that is, using the information of the parallax image corresponding to a left guardrail 611, a right guardrail 612, a car 613, and a car 614 in the reference image Ia illustrated in a section (a) of FIG. 11. The U map UM is a two-dimensional histogram representing a frequency distribution of parallax values dp, with the horizontal axis thereof representing the x axis of the reference image Ia, and the vertical axis representing a parallax value dp in the parallax image (or a distance). The left guardrail 611 in the reference image Ia illustrated in the section (a) of FIG. 11 corresponds to a left guardrail portion 611a in the U map UM, and the right guardrail 612 corresponds to a right guardrail portion 612a. The car 613 corresponds to a car portion 613a, and the car 614 corresponds to a car portion 614a.

The fourth generating unit 502 also generates a U map UM_H that is an example of the U-disparity map illustrated in a section (c) of FIG. 11, using only the information that is positioned above the road surface detected from the V map VM, that is, using the information of the parallax image corresponding to the left guardrail 611, the right guardrail 612, the car 613, and the car 614 in the reference image Ia illustrated in the section (a) of FIG. 11. The U map UM_H, which is an example of the U-disparity map, is an image with the horizontal axis thereof representing the x axis of the reference image Ia, the vertical axis thereof representing a parallax value dp in the parallax image, and the pixel value thereof representing the height of the objects. The left guardrail 611 in the reference image Ia illustrated in the section (a) of FIG. 11 corresponds to a left guardrail portion 611b in the U map UM_H, and the right guardrail 612 corresponds to a right guardrail portion 612b. The car 613 corresponds to a car portion 613b, and the car 614 corresponds to a car portion 614b.

The fifth generating unit 503 is a functional unit that generates a real U map RM (first frequency image) that is a real U-disparity map illustrated in a section (b) of FIG. 12 resultant of converting the horizontal axis of the U map UM, illustrated in a section (a) of FIG. 12 and generated by the fourth generating unit 502, into an actual distance. The real U map RM is a two-dimensional histogram with the horizontal axis thereof representing the actual distance in the direction travelling from the image capturing unit 10b (left camera) to the image capturing unit 10a (right camera), and the vertical axis representing the parallax value dp in the parallax image (or a depth-direction distance converted from the parallax value dp). The left guardrail portion 611a in the U map UM illustrated in the section (a) of FIG. 12 corresponds to a left guardrail portion 611c in the real U map RM, and the right guardrail portion 612a corresponds to a right guardrail portion 612c. The car portion 613a corresponds to a car portion 613c, and the car portion 614a corresponds to a car portion 614c.

Specifically, the fifth generating unit 503 generates a real U map RM corresponding to a bird's-eye view by decimating a larger number of pixels at a near distance, because an object is represented larger at a near distance, contains a larger amount of parallax information, and has a high distance resolution in the U map UM, but not decimating any pixels at a far distance, because an object is represented smaller at a far distance (has a smaller parallax value dp), contains a small amount of parallax information, and has a low distance resolution. A cluster of pixel values (object) (an "isolated region", which will be described later) can be extracted from the real U map RM in the manner described below. The width of a rectangle surrounding the cluster corresponds to the width of the extracted object, and the height corresponds to the depth of the extracted object. The fifth generating unit 503 may also generate the real U map RM directly from the parallax image, without limitation to the generation of the real U map RM from the U map UM.

Furthermore, the second generating unit 500 can identify the position and the width of the object in the x-axis direction (xmin, xmax) in the parallax image and the reference image Ia, from the generated U map UM or real U map RM. Furthermore, the second generating unit 500 can identify the actual depth of the object (dmin, dmax) from the information of the height of the object in the generated U map UM or real U map RM. Furthermore, the second generating unit 500 can identify the position and the height of the object in the y-axis direction in the parallax image and the reference image Ia from the generated V map VM (ymin="the y coordinate corresponding to the maximum height from a road surface with the greatest parallax value", ymax="the y coordinate indicating the height of a road surface acquired from the greatest parallax value"). Furthermore, the second generating unit 500 can identify the actual size of the object in the x-axis direction and the y-axis direction from the width in the x-axis direction (xmin, xmax) and the height in the y-axis direction (ymin, ymax) of the object identified in the parallax image, and the parallax values dp corresponding to xmin, and xmax, and ymin, and ymax, respectively. As described earlier, the second generating unit 500 can identify the position, and the actual width, height, and depth of the object in the reference image Ia, using the V map VM, the U map UM, and the real U map RM. Furthermore, because the position of the object in the reference image Ia is identified, the position of the object in the parallax image is also identified, and therefore, the second generating unit 500 can identify the distance to the object.

The second generating unit 500 can then identify what the object is from the identified actual size of the object (the width, the height, and the depth), using [Table 1] indicated below. For example, when the object has a width of 1300 [mm], a height of 1800 [mm], and a depth of 2000 [mm], the second generating unit 500 can identify that the object is a "standard size car". Information such as that indicated in [Table 1] in which a width, a height, and a depth are mapped to an object type may be stored as a table in the RAM 54, for example.

TABLE 1

| Object Type | Width | Height | Depth |
|---|---|---|---|
| Motorcycle, Bicycle | <1100 | <2500 | >1000 |
| Pedestrian | <1100 | <2500 | <=1000 |
| Compact Car | <1700 | <1700 | <10000 |
| Standard Size Car | <1700 | <2500 | <10000 |
| Truck | <3500 | <3500 | <15000 |
| Others | Those with Size Outside of Ranges Specified Above | | |

Unit (mm)

The third generating unit 501, the fourth generating unit 502, and the fifth generating unit 503 included in the second generating unit 500 illustrated in FIG. 9 are all implemented by the FPGA 51 illustrated in FIG. 6. The third generating unit 501, the fourth generating unit 502, and the fifth generating unit 503 may also be implemented by, partly or entirely, causing the CPU 52 to execute a computer program stored in the ROM 53, instead of the FPGA 51 that is a hardware circuit.

Figure 13:
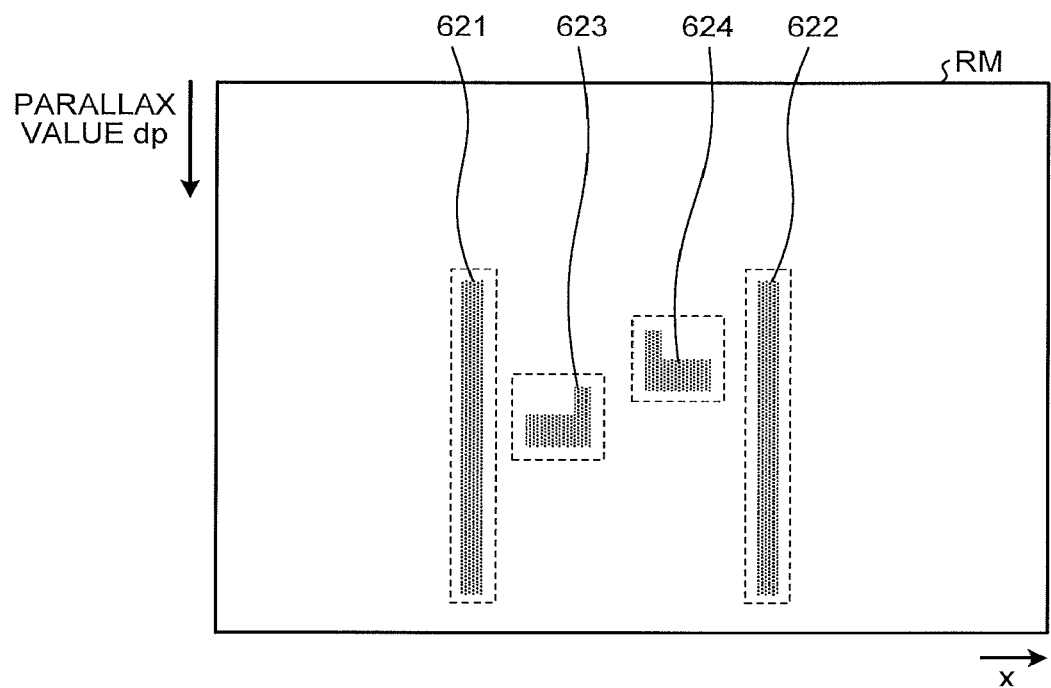
FIG. 13 is a schematic for explaining a process for extracting an isolated region from the real U map.
Figure 15:
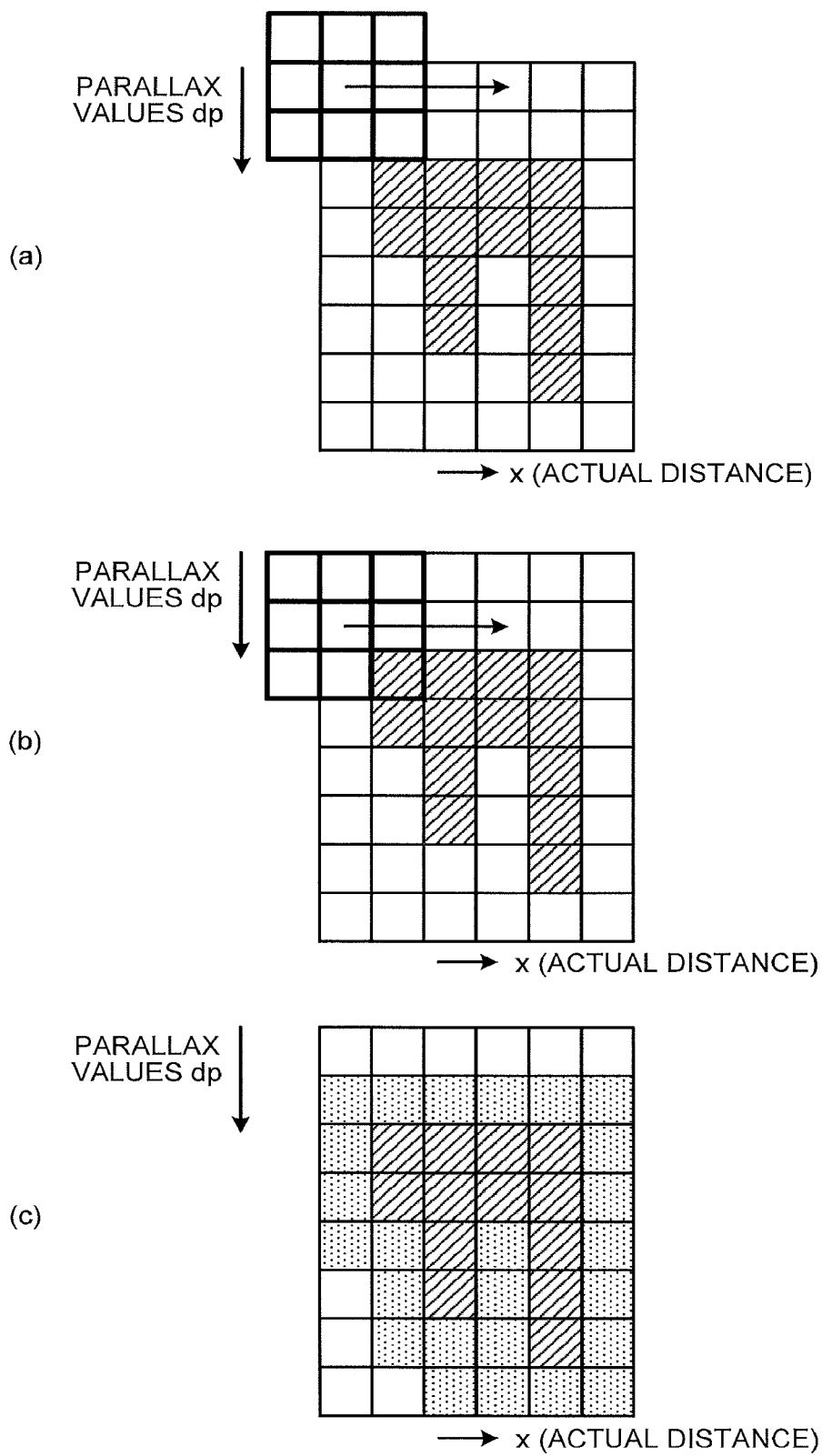
FIG. 15 is a schematic for explaining a process of smoothing the isolated region.
Figure 18:
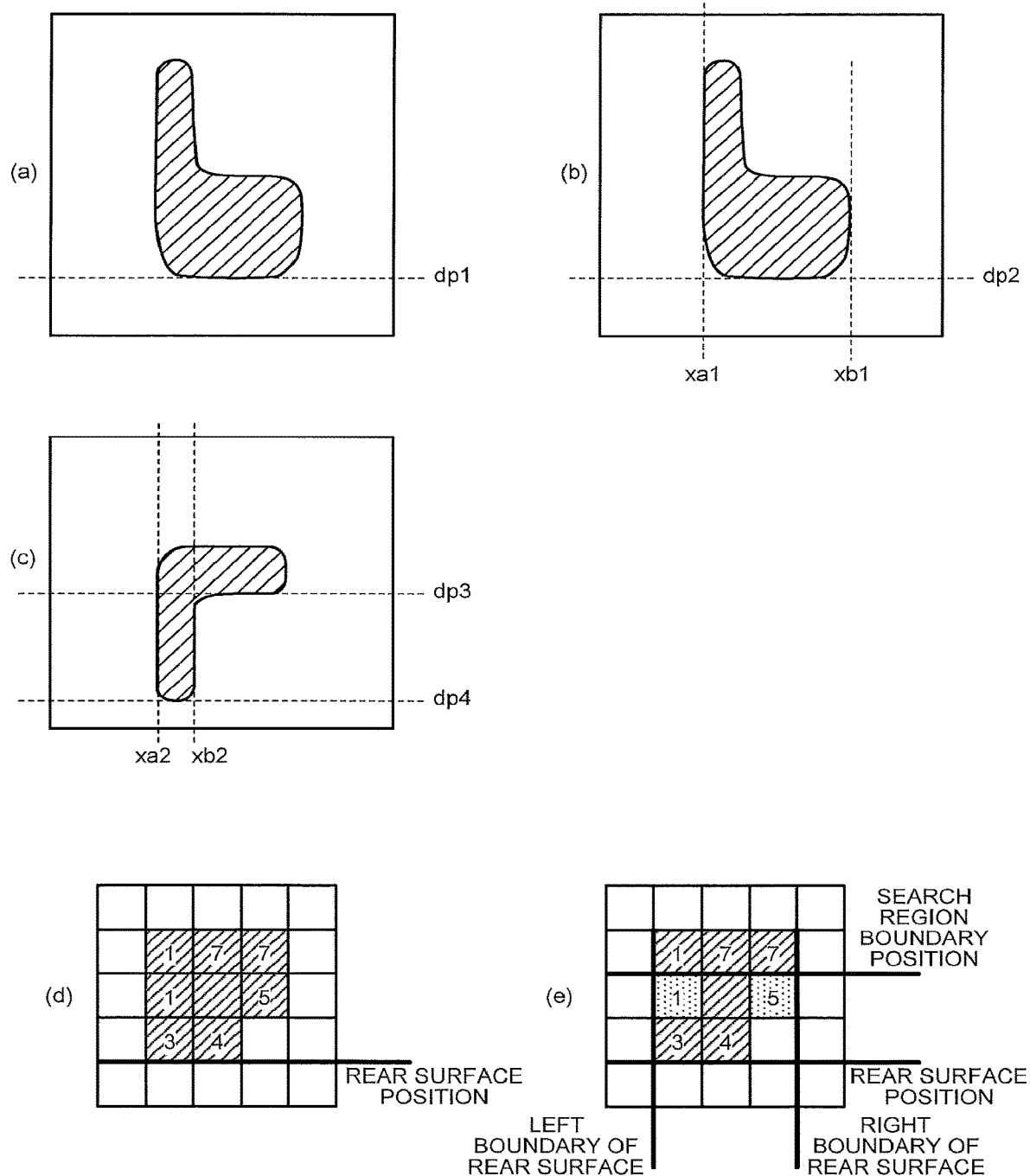
FIG. 18 is a schematic for explaining a process of detecting a rear surface and side surfaces from the isolated region.
Figure 20:
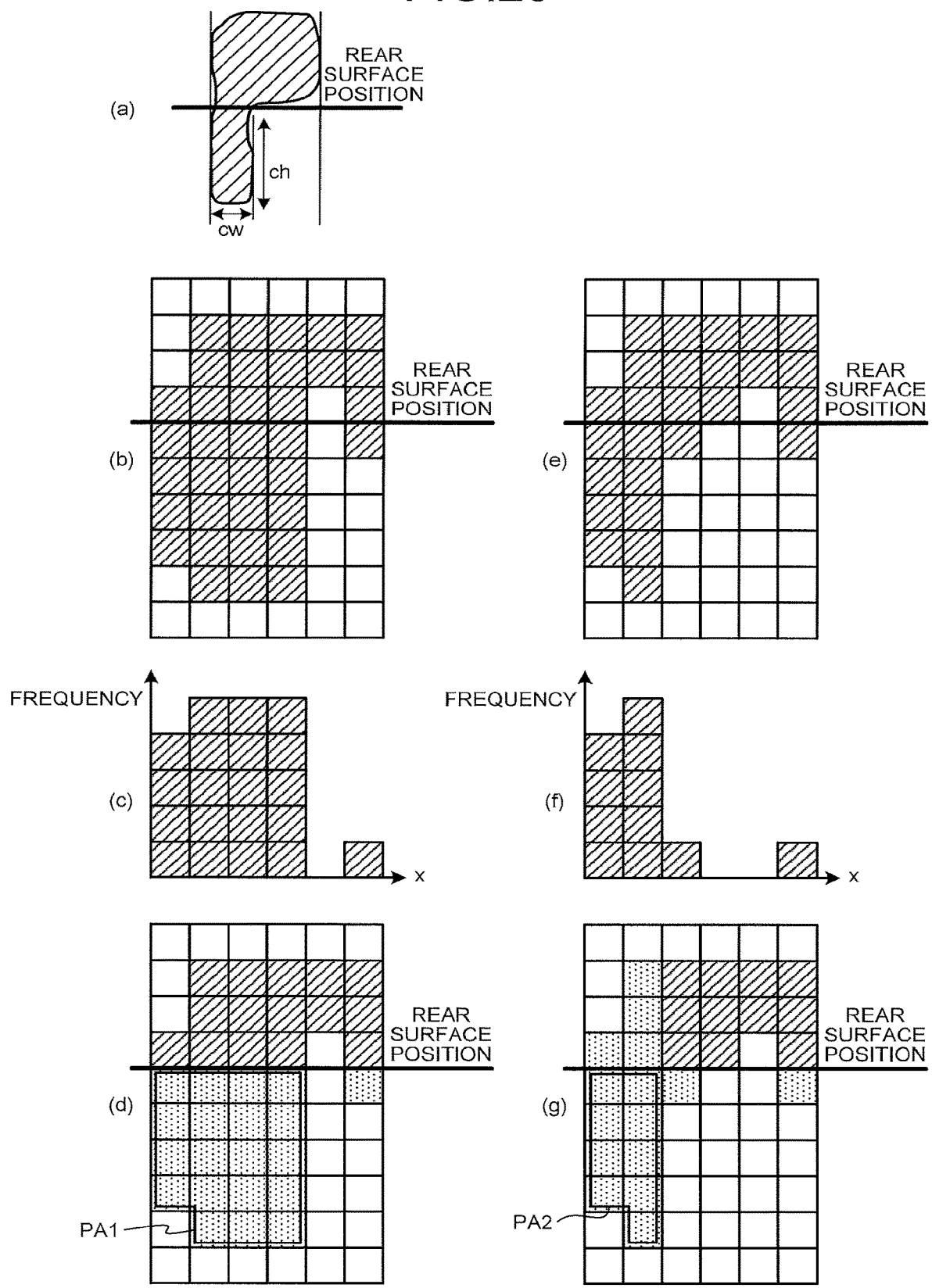
FIG. 20 is a schematic for explaining a process of cutting a region to be cut from the isolated region.

FIG. 13 is a schematic for explaining a process for extracting an isolated region from the real U map. FIG. 14 is a schematic illustrating an example of an object-recognized region corresponding to the extracted isolated region. FIG. 15 is a schematic for explaining a process of smoothing the isolated region. FIG. 16 is a schematic for generally explaining a process of extracting a contour from the isolated region. FIG. 17 is a schematic for explaining the process of extracting a contour from the isolated region, in detail. FIG. 18 is a schematic for explaining a process of detecting a rear surface and side surfaces from the isolated region. FIG. 19 is a schematic for explaining a process of determining whether the detected rear surface is valid. FIG. 20 is a schematic for explaining a process of cutting a region to be cut from the isolated region. Configurations and operations of the input unit 511 and the first surface detecting unit 512 included in the clustering processing unit 510 of the recognition processing unit 5 will now be explained with reference to FIGS. 9, and 13 to 20.

The input unit 511 is a functional unit that inputs the reference image Ia and the parallax image received from the second generating unit 500, and the V map VM, the U map UM, the U map UM_H, and the real U map RM generated by the second generating unit 500. The input unit 511 sends the reference image Ia, the parallax image, the V map VM, the U map UM, the U map UM_H, and the real U map RM to the first surface detecting unit 512 as input information. Without limitation to receiving these images from the second generating unit 500, the input unit 511 may also receive these images by reading the images stored in the RAM 34 or the RAM 54 illustrated in FIG. 6, a recording medium such as a compact disc (CD), a digital versatile disc (DVD), or a hard disk drive (HDD), or a network storage, for example.

The first surface detecting unit 512 is a functional unit that executes a first surface detecting process for recognizing an object based on the input information received from the input unit 511, and for detecting the rear surface and the side surfaces of the object. The first surface detecting unit 512 recognizes, in particular, a vehicle as an object to be recognized, and detects an object (vehicle) having a width, and a depth specified in [Table 2] as an object to which the first surface detecting process is to be applied. At this time, the first surface detecting unit 512 may perform the first surface detecting process only to the isolated regions (objects) that are extracted by the region extracting unit 513, which will be described later, and that satisfies the conditions specified in [Table 2], for example.

TABLE 2

| Items | Descriptions |
|---|---|
| Width for Which Surface Is to Be Detected | Equal to or Greater than 1100 [mm] |
| Depth for Which Surface Is to Be Detected | Equal to or Greater than 1000 [mm] |

The first surface detecting unit 512 includes a region extracting unit 513 (first extracting unit), a smoothing unit 514, a contour extracting unit 515 (second extracting unit), a rear surface detecting unit 516 (detecting unit), a first determining unit 517, and a cutting unit 518 (deleting unit).

The region extracting unit 513 is a functional unit that extracts an isolated region (first region), which is a cluster of pixel values, from the real U map RM, among the pieces of information received from the input unit 511. Specifically, the region extracting unit 513 applies processes such as a binarizing process and a labelling process to the real U map RM, and extracts an isolated region for each piece of identification information assigned in the labelling process. For example, FIG. 13 illustrates some isolated regions extracted from the real U map RM. In the example of the real U map RM illustrated in FIG. 13, isolated regions 621 to 624 are extracted, as isolated regions, by the region extracting unit 513. The isolated regions extracted by the region extracting unit 513 correspond to the respective objects included in the reference image Ia, and represents the object recognized regions in the reference image Ia. For example, FIG. 14 illustrates some examples of object recognized regions, corresponding to the isolated regions extracted by the region extracting unit 513, in the reference image Ia. A section (a) of FIG. 14 represents an example of a vehicle recognized region. A section (b) of FIG. 14 represents an example of a person recognized region, and a section (c) of FIG. 14 represents an example of a guardrail recognized region (a guardrail being an example of a side surface object that is installed along a roadside).

The region extracting unit 513 generates recognized region information that is information related to an isolated region, for each of the extracted isolated regions, and, in this example, the recognized region information includes, identification information assigned in the labelling process, and the information of the position and the size of the isolated region in the real U map RM. The region extracting unit 513 sends the generated recognized region information to the smoothing unit 514.

The smoothing unit 514 is a functional unit that applies smoothing for reducing the noise and the parallax dispersion that are present in the real U map RM, to the isolated regions extracted by the region extracting unit 513. Specifically, the smoothing unit 514 prepares a mask having a size of three by three, illustrated in a section (a) of FIG. 15, and performs a raster scan of the isolated region. If any pixel of the mask overlaps with any pixel of the isolated region, but the pixel at the center of the mask does not have any pixel value, as illustrated in a section (b) of FIG. 15, the pixel at the center is filled with a pixel value to smooth the isolated region. The pixel may be filled with a pixel value (frequency) with which the pixel of the mask overlaps, in the isolated region, or the identification information assigned to the isolated region in the labelling process, for example. Once the smoothing unit 514 fills some pixels to the isolated region, the pixels at the width of one pixel around the original isolated region are filled with pixel values, as illustrated in a section (c) of FIG. 15. In the subsequent process, a region including the original isolated region and the region filled with the pixel values is handled as a new isolated region. The smoothing unit 514 includes the information representing the position and the size of the new isolated region in the real U map RM in the recognized region information, and sends the resultant recognized region information to the contour extracting unit 515.

The contour extracting unit 515 is a functional unit that extracts a contour by identifying direction vectors (contour vectors) in adjacent pixels, among the pixels forming the contour of the isolated region that is resultant of the smoothing performed by the smoothing unit 514. In the embodiment, the direction along which the pixels forming the contour of the isolated region are arrayed will be explained as a contour direction. In other words, in the embodiment, the contour direction is explained as a contour vector. To explain generally how the contour is extracted, for a specific isolated region illustrated in a section (a) of FIG. 16, the contour extracting unit 515 identifies the direction vectors in adjacent pixels, across the pixels forming the contour of the isolated region, as illustrated in a section (b) of FIG. 16. Specifically, to begin with, a mask that has a size of three by three, and in which numbers "0" to "7" are assigned to the pixels around a pixel of interest, which is the pixel at the center, is prepared, as illustrated in a section (b) of FIG. 17. The contour extracting unit 515 then scans the isolated region with the mask in a direction from the left to the right, sequentially from the bottom row, as illustrated in a section (a) of FIG. 17, and keeps scanning until the pixel of interest in the mask overlaps with a pixel of the isolated region, as illustrated in a section (c) of FIG. 17. The contour extracting unit 515 then searches for a pixel belonging to the isolated region, starting from the pixel "3" in the mask, in the counter-clockwise direction around the pixel corresponding to the pixel of interest in the mask (that is, in the order of the pixels "3, 4, 5, 6, 7, 0, 1, 2"). In the example illustrated in the section (c) of FIG. 17, the contour extracting unit 515 finds the pixel on the right side of the pixel corresponding to the pixel of interest. Therefore, "3" that is the number corresponding to the pixel on the right side is assigned as information specifying the contour vector of the pixel corresponding to the pixel of interest, as illustrated in a section (d) of FIG. 17. In other words, the contour extracting unit 515 identifies that the pixel of the isolated region assigned with "3" (pixel corresponding to the pixel of interest) has an adjacent pixel in the direction of the pixel "3" with reference to the pixel of interest in the mask.

The contour extracting unit 515 then applies the mask in such a manner that the pixel of interest overlaps with an adjacent pixel that is identified by the contour vector (the adjacent pixel being the pixel on the right side of the pixel assigned with "3" in the example of a section (e) of FIG. 17). The contour extracting unit 515 then searches for a pixel belonging to the isolated region, starting from the position one pixel ahead (the position corresponding to "0") of the pixel for which the contour vector is identified previously (the pixel assigned with "3" in the section (d) of FIG. 17), in the counter-clockwise direction around the pixel corresponding to the pixel of interest (that is, in the order of the pixels "0, 1, 2, 3, 4, 5, 6, 7"). In the example illustrated in the section (e) of FIG. 17, the contour extracting unit 515 finds a pixel on the upper-right side of the pixel corresponding to the pixel of interest. Therefore, the number "4" corresponding to the upper right pixel is assigned as information specifying the contour vector of the pixel corresponding to the pixel of interest. As a result of identifying the contour vectors in the manner described above, a number (information) indicating a contour vector is assigned to each of the pixels forming the contour of the isolated region, as illustrated in a section (f) of FIG. 17.

The contour extracting unit 515 includes the information specifying the contour vectors assigned to the pixels forming the contour of the isolated region, in the recognized region information, and sends the resultant recognized region information to the rear surface detecting unit 516. In the process of searching for a pixel of the isolated region, the contour extracting unit 515 is explained to search for the pixel in the counter-clockwise direction around the pixel corresponding to the pixel of interest. This order, however, assumes that the mask is scanned in the direction from the left to the right, from the bottom row to the top row. When the mask is scanned in a direction from the right to the left, from the bottom row to the top row, the contour extracting unit 515 needs to search for a pixel in the clockwise direction around the pixel of interest. Reflecting the intention to prioritize nearer objects over further objects in the subsequent control, the mask is scanned from the bottom row, because isolated regions positioned lower in the real U map RM represent nearer objects.

The rear surface detecting unit 516 is a functional unit that detects the positions of the rear surface (first surface) and the side surfaces (second surfaces) of the isolated region with the contour extracted by the contour extracting unit 515. Specifically, the rear surface detecting unit 516 detects the position of the rear surface of the isolated region using two methods. Hereinafter, these two methods are referred to as a "first detection method" and a "second detection method", respectively.

To begin with, a detection of the rear surface position using the first detection method will be explained. The rear surface detecting unit 516 identifies, in the direction of parallax values dp in the isolated region, a position with the largest number of pixels specified with "2", "3", or "4", as the information indicating the contour vector identified by the contour extracting unit 515, that is, a position with the largest number of pixels having a contour vector oriented in the direction from the left to the right. For example, as illustrated in a section (a) of FIG. 18, when the rear surface detecting unit 516 determines that there are largest number of pixels specified with "2", "3", or "4", as the information indicating the contour vector, at a rear surface position dp1 in the vertical direction of the isolated region (in the direction of parallax values dp), the rear surface detecting unit 516 detects that the rear surface of the isolated region is positioned at the rear surface position dp1 (in the direction of parallax values dp).

A detection of the rear surface position using the second detection method will now be explained. To begin with, as illustrated in a section (b) of FIG. 18, the rear surface detecting unit 516 identifies, in the x direction of the isolated region, a position with the largest number of pixels specified with "0", "1", or "2", as the information indicating the contour vector identified by the contour extracting unit 515, that is, a position with the largest number of pixels having a contour vector orientated in a direction from the top to the bottom, as a left position xa1. The rear surface detecting unit 516 then identifies, in the x direction of the isolated region, a position with the largest number of pixels specified with "4", "5", or "6", as information specifying the contour vector identified by the contour extracting unit 515, that is, a position with the largest number of pixels having a contour vector oriented in the direction from the bottom to the top, as a right position xb1, as illustrated in the section (b) of FIG. 18. The rear surface detecting unit 516 then identifies, in the direction of parallax values dp in the isolated region, a position with the largest number of pixels specified with "2", "3", or "4" as the information indicating the contour vector, that is, a position with the largest number of pixels having a contour vector oriented in the direction from the left to the right, within the range between the left position xa1 and the right position xb1. If the rear surface detecting unit 516 determines that there are largest number of pixels specified with "2", "3", or "4", as the information indicating the contour vector, at a rear surface position dp2 in the vertical direction (in the direction of parallax values dp), within the range between the left position xa1 and the right position xb1, as illustrated in the section (b) of FIG. 18, the rear surface detecting unit 516 detects that the rear surface of the isolated region is positioned at the rear surface position dp2 (in the direction of parallax values dp).

There are, however, sometimes cases in which the position of the rear surface of the isolated region detected using the first detection method and that detected using the second detection method are different. For example, in the example of the isolated region illustrated in a section (c) of FIG. 18, the position, in the direction of parallax values dp, with the largest number of pixels having a contour vector oriented in the direction from the left to the right is a rear surface position dp3. In other words, the rear surface position of the isolated region identified with the first detection method is the rear surface position dp3. By contrast, assuming that a position, in the x direction, with the largest number of pixels having a contour vector oriented in the direction from the top to the bottom is a left position xa2, and a position, in the x direction, with the largest number of pixels having a contour vector oriented in the direction from the bottom to the top is a right position xb2, a position, in the direction of parallax values dp, with the largest number of pixels having a contour vector oriented in the direction from the left to the right, within the range between the left position xa1 and the right position xb1, is a rear surface position dp4. In other words, the rear surface position of the isolated region identified with the second detection method is the rear surface position dp4. In the manner described above, while the rear surface position of the isolated region is detected as the rear surface position dp3 with the first detection method, the position of the rear surface is detected as the rear surface position dp4 with the second detection method. In this manner, different positions may be detected as the position of the rear surface. In such a case, by causing the first determining unit 517 to determine the validity of the rear surface, which will be described later, the position determined to be valid may be selected as the position of the rear surface.

The approach by which the rear surface detecting unit 516 detects the position of the rear surface is not limited to the approach using both of the first detection method and the second detection method. The rear surface detecting unit 516 may also detect the position of the rear surface using one of these detection methods.

The rear surface detecting unit 516 then detects the position of the side surfaces of the isolated region. Specifically, the rear surface detecting unit 516 calculates the distance to the rear surface based on the parallax values dp of the detected rear surface position, as illustrated in a section (d) of FIG. 18. The rear surface detecting unit 516 identifies a predetermined position on a far-side of the detected rear surface position (search region boundary position). For example, as illustrated in a section (e) of FIG. 18, the rear surface detecting unit 516 establishes a position at a distance of 110[%] of the distance to the rear surface, from the position of the rear surface, as a search region boundary position, for example. The rear surface detecting unit 516 then detects, in the x direction, a position with the largest number of pixels specified with "0", "1", or "2" as the information indicating the contour vector, that is, the position with the largest number of pixels having a contour vector oriented in the direction from the top to the bottom, within the range between the rear surface position and the search region boundary position, in the direction of parallax values dp, as a position of the left-side surface of the isolated region ("left boundary of rear surface" illustrated in the section (e) of FIG. 18). The rear surface detecting unit 516 also detects, in the x direction, a position with the largest number of pixels specified with "4", "5", or "6" as the information indicating the contour vector, that is, a position with the largest number of pixels having a contour vector oriented in the direction from the bottom to the top, within the range between the rear surface position and the search region boundary position, in the direction of parallax values dp, as a position of the right-side surface of the isolated region ("right boundary of rear surface" illustrated in the section (e) of FIG. 18).

The rear surface detecting unit 516 includes the information of the positions of the detected rear surface and side surfaces (the left-side surface and the right-side surface) of the isolated region in the recognized region information, and sends the resultant recognized region information to the first determining unit 517.

The first determining unit 517 is a functional unit that determines whether the rear surface detecting unit 516 has detected the rear surface correctly, that is, determines the validity of the rear surface. Specifically, the first determining unit 517 determines whether the rear surface detected by the rear surface detecting unit 516 satisfies every condition indicated as an example in [Table 3] below. If every condition is satisfied, the first determining unit 517 determines that the rear surface has been detected correctly.

TABLE 3

| Items | Descriptions |
| --- | --- |
| Width of Rear Surface (w_b) | Equal to or Greater than 1100 [mm] |
| Difference between Distance at Right End and Distance at Left End of Rear Surface (diff) | Less than 25% of Distance of Nearest Portion |
| Depth of Entire Isolated Region (len) | Greater than 1000 [mm] |

For example, in a section (a) of FIG. 19, it is assumed herein that the rear surface detecting unit 516 has detected a portion drawn with a bold line as the rear surface of the isolated region. A left position xa3 illustrated the section (a) of in FIG. 19 is the position of the left-side surface of the isolated region, detected by the rear surface detecting unit 516, and a right position xb3 is the position of the right-side surface of the isolated region, detected by the rear surface detecting unit 516. The first determining unit 517 calculates a width w_b of the rear surface of the isolated region, from the left position xa3 and the right position xb3. The first determining unit 517 then determines whether the width w_b satisfies a predetermined condition. In the example of [Table 3] indicated above, the first determining unit 517 determines whether the width w_b is equal to or greater than 1100 [mm].

The first determining unit 517 also determines whether a difference diff satisfies a predetermined condition. The difference diff represents a difference between a distance that is determined by the parallax value at the left end (the left position xa3 in the x direction), and a distance that is determined by the parallax value at the right end (the right position xb3 in the x direction) of the rear surface detected by the rear surface detecting unit 516. In the example of [Table 3] indicated above, the first determining unit 517 determines whether the difference diff is less than 25[%] of the distance of the nearest portion of the rear surface. Without limitation to determining whether the difference diff is less than 25[%] of the distance of the nearest portion, the first determining unit 517 may also make determination against a value about a distance taking a parallax error component into consideration.

The first determining unit 517 then calculates the depth len of the isolated region, as illustrated in a section (b) of FIG. 19. The first determining unit 517 determines whether the depth len satisfies a predetermined condition. In the example of [Table 3] indicated above, the first determining unit 517 determines whether the depth len is greater than 1000 [mm].

For example, applying the conditions listed in [Table 3] indicated above, and assuming that the rear surface of a vehicle has a width of 1200 [mm], with the rear surface at a distance of 8 [m] ahead, because 25[%] of the distance 8 [m] is 2000 [mm], the first determining unit 517 determines that the rear surface is valid as a rear surface, up to a limit of an inclination of approximately 60 [degrees], as illustrated in a section (c) of FIG. 19.

The first determining unit 517 includes the result of determining whether the rear surface detected by the rear surface detecting unit 516 has been detected correctly, that is, the result of determining the validity of the rear surface in the recognized region information. If the first determining unit 517 determines that the rear surface has been detected correctly, the first determining unit 517 sends the recognized region information to the cutting unit 518. If the first determining unit 517 determines that the rear surface has not been detected correctly, the first determining unit 517 sends the recognized region information to the frame creating unit 519.

The cutting unit 518 is a functional unit that, when the first determining unit 517 determines that the rear surface is valid, cuts (deletes) a region that is rendered unnecessary (cut region) from the isolated region specified in the recognized region information received from the first determining unit 517. Specifically, to begin with, the cutting unit 518 determines whether a cut region is to be cut from the isolated region by, for example, determining whether the conditions indicated in [Table 4] are satisfied. For example, as illustrated in a section (a) of FIG. 20, if a ratio ch/cw of the depth (cut height ch) of a near-side region, being on a near side with respect to the rear surface position, with respect to the width (cut width cw) thereof in the isolated region is equal to or greater than two, and if the cut height ch is equal to or greater than 40[%] of the distance to the isolated region, the cutting unit 518 determines that the cut region is to be cut from the isolated region. Without limitation to determining whether the cut height ch is equal to or greater than 40[%] of the distance to the isolated region, the cutting unit 518 may determine against a value about a distance taking a parallax error component or noise into consideration.

TABLE 4

| Items | Descriptions |
| --- | --- |
| Height/Width Ratio (ch/cw) of Region on Near Side of Rear Surface | Equal to or Greater than 2 |
| Cut Height (ch) | Equal to or Greater than 40% of Distance to Isolated Region |

When the cutting unit 518 determines that the cut region is to be cut from the isolated region, the cutting unit 518 identifies a protruding region (fourth region) from the near-side region, being on the near side with respect to the rear surface position, in the isolated region. Specifically, the cutting unit 518 creates a histogram such as that illustrated in a section (c) of FIG. 20, using pixels corresponding to the near-side region of the isolated region, being on the near side with respect to the rear surface position, as illustrated in a section (b) of FIG. 20. In this histogram, the frequency plotted to the vertical axis represents a pixel count at the corresponding x axis position, for example. The cutting unit 518 identifies the x position of the highest graph in the histogram. In the example illustrated in the section (c) of FIG. 20, the second to the fourth graphs from the left in the x direction are the highest. The cutting unit 518 then identifies a graph having a height equal to or greater than 80[%] of the height of the highest graph, for example, and is continuous from the x position of the highest graph. In the example illustrated in the section (c) of FIG. 20, the cutting unit 518 identifies the first graph adjacent to the second graph, which is the highest graph, from the left as a graph having a height equal to or greater than 80[%] of the height of the highest graph. The cutting unit 518 identifies a region corresponding to the identified highest graph (the second to the fourth graphs from the left in the x direction), and to the graph having a height equal to or greater than 80[%] and being continuous to the highest graph (the first graph from the left in the x direction), as the protruding region, from the near-side region, being on the near side with respect to the rear surface position, in the isolated region (a protruding region PA1 illustrated in a section (d) of FIG. 20).

Furthermore, in the example of a section (e) of FIG. 20, the cutting unit 518 creates a histogram such as that illustrated in a section (f) of FIG. 20, using the pixels corresponding to the near-side region of the isolated region, being on the near side with respect to the rear surface position. The cutting unit 518 then identifies the x position of the highest graph in the histogram. In the example illustrated in the section (f) of FIG. 20, the second graph from the left in the x direction is the highest. The cutting unit 518 identifies a graph having a height equal to or greater than 80[%] of the height of the highest graph, for example, and is continuous from the x position of the highest graph. In the example illustrated in the section (f) of FIG. 20, the cutting unit 518 identifies the first graph adjacent to the second graph, which is the highest graph, from the left as a graph having a height equal to or greater than 80[%] of the height of the highest graph. The cutting unit 518 ignores the third graph adjacent to the second graph, which is the highest graph, from the left, because the third graph does not have a height equal to or greater than 80[%] of the height of the highest graph. The cutting unit 518 identifies a region corresponding to the identified highest graph (the second graph from the left in the x direction), and to the graph having a height equal to or greater than 80[%] and being continuous to the highest graph (the first graph from the left in the x direction), as the protruding region, from the near-side region, being on the near side with respect to the rear surface position, in the isolated region (a protruding region PA2 illustrated in a section (g) of FIG. 20).

The cutting unit 518 then determines whether the identified protruding region has a width that is equal to or greater than a half of the width of the entire isolated region, in the x direction. If the width of the protruding region is equal to or greater than a half of the width of the entire isolated region, as illustrated in the section (d) of FIG. 20, the cutting unit 518 cuts (deletes) the near-side region (third region) including the protruding region, being on the near side with respect to the rear surface position, from the isolated region, and establishes the region resultant of cutting as a new isolated region. The reason why only the near-side region including the protruding region, being on the near side with respect to the rear surface position, is cut is that, when the width of the protruding region is equal to or greater than a half of the width of the entire isolated region, it is highly likely that the protruding portion includes the vehicle. If the width of the protruding region is less than a half of the width of the isolated region, as illustrated in the section (g) of FIG. 20, the cutting unit 518 cuts (deletes) the near-side region including the protruding region, being on the near side with respect to the rear surface position, and the far-side region corresponding to the protruding region, being on the far side with respect to the rear surface position, from the isolated region, and establishes the region resultant of cutting as a new isolated region. The reason why the far-side region corresponding to the protruding region, as well as the near-side region including the protruding region, being on the far side and the near side with respect to the rear surface position, are cut is that the protruding portion is highly likely to be a side surface object, and the isolated region is not affected very much even if the far-side region is cut.

In the process of identifying the protruding region, by setting the height of the protruding region to a height equal to or greater than 80[%] of the greatest height in the histogram, it is possible to identify the protruding region while suppressing the influence of noise. The cutting unit 518 is explained to determine whether the width of the protruding region is equal to or greater than a half of the width of the entire isolated region, but the embodiment is not limited to a half, and the cutting unit 518 may also determine whether the width of the protruding region is equal to or greater than one third of the entire isolated region, for example.

The cutting unit 518 includes the information of the position and the size of the new isolated region, having been applied with cutting, in the real U map RM in the recognized region information, and sends the resultant recognized region information to the frame creating unit 519.

The input unit 511, and the region extracting unit 513, the smoothing unit 514, the contour extracting unit 515, the rear surface detecting unit 516, the first determining unit 517, and the cutting unit 518 included in the first surface detecting unit 512, all of which are illustrated in FIG. 9, are implemented by the FPGA 51 illustrated in FIG. 6. The input unit 511, and the region extracting unit 513, the smoothing unit 514, the contour extracting unit 515, the rear surface detecting unit 516, the first determining unit 517, and the cutting unit 518 included in the first surface detecting unit 512 may also be implemented by, partly or entirely, causing the CPU 52 to execute a computer program stored in the ROM 53, instead of the FPGA 51 that is a hardware circuit.

The processes performed by the smoothing unit 514, the first determining unit 517, and the cutting unit 518 included in the first surface detecting unit 512 are not mandatory processes, so the first surface detecting unit 512 may not include at least one of the smoothing unit 514, the first determining unit 517, and the cutting unit 518.

Figure 21:
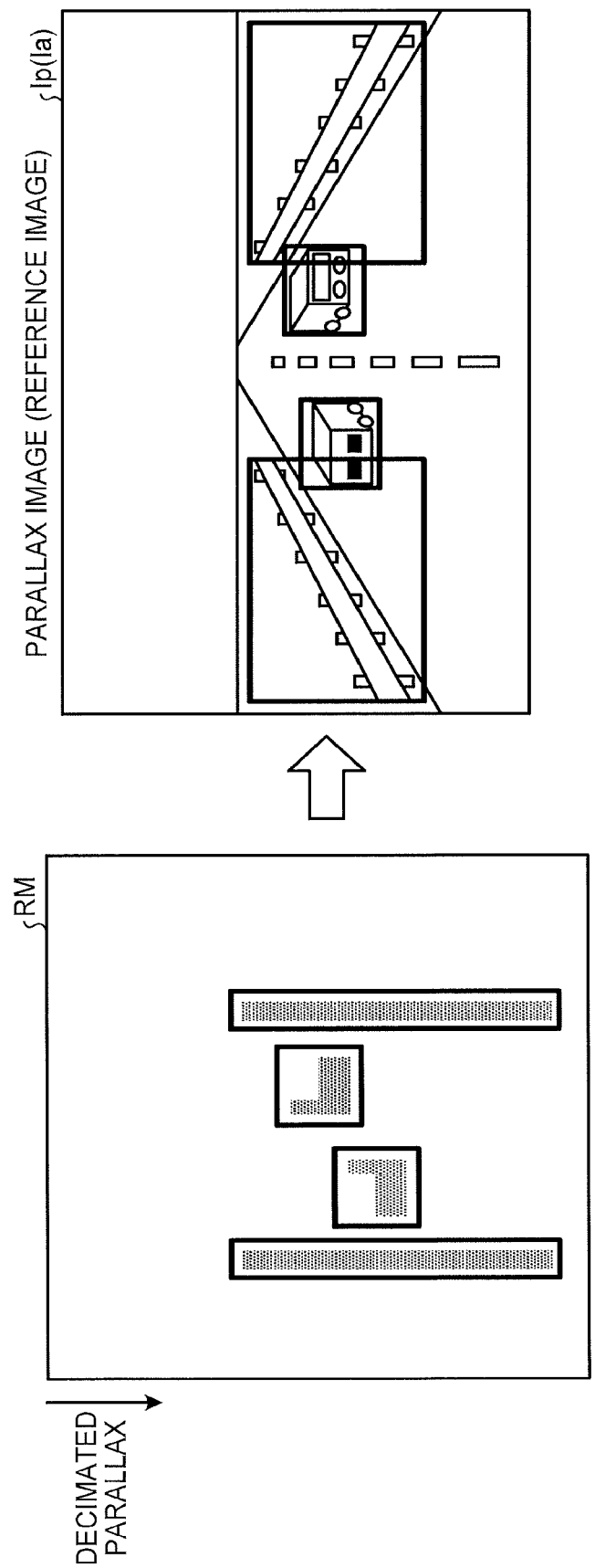
FIG. 21 is a schematic for explaining a process for creating a detection frame.

FIG. 21 is a schematic for explaining a process for creating a detection frame. An operation performed by the frame creating unit 519 included in the clustering processing unit 510 that is provided to the recognition processing unit 5 will now be explained with reference to FIGS. 9 and 21.

The frame creating unit 519 is a functional unit that creates a frame around an object region corresponding to the isolated region (recognized region) in the parallax image Ip (or the reference image Ia), as illustrated in FIG. 21, using the isolated region in the real U map RM, the isolated region being extracted by the region extracting unit 513, smoothed by the smoothing unit 514, having a contour extracted by the contour extracting unit 515, having the rear surface and the side surfaces detected by the rear surface detecting unit 516, and having an unnecessary part cut (deleted) by the cutting unit 518. The frame creating unit 519 includes information of the frame created in the parallax image Ip (or the reference image Ia) in the recognized region information, and sends the resultant recognized region information to the second surface detecting unit 520.

The frame creating unit 519 is implemented by the FPGA 51 illustrated in FIG. 6. The frame creating unit 519 may also be implemented by causing the CPU 52 to execute a computer program stored in the ROM 53, instead of the FPGA 51 that is a hardware circuit.

Figure 22:
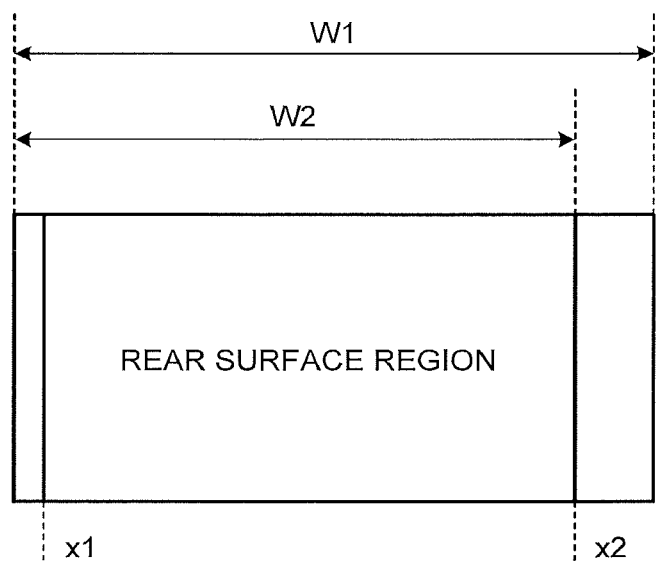
FIG. 22 is a schematic for explaining a process of selecting one of the side surfaces and a process of determining a rear surface region.

FIG. 22 is a schematic for explaining a process of selecting one of the side surfaces and a process of determining a rear surface region. FIG. 23 is a schematic for explaining a process of determining whether an object is a side surface object. Configurations and operations of the second surface detecting unit 520 and the output unit 524 included in the clustering processing unit 510 that is provided to the recognition processing unit 5 will now be explained with reference to FIGS. 9, 22, and 23.

The second surface detecting unit 520 is a functional unit that executes a second surface detecting process for specifically identifying the rear surface and the side surfaces of the object region that is indicated by the recognized region information, and identifying the type of the surfaces of the object, based on the input information received from the input unit 511, and the recognized region information received from the frame creating unit 519. The second surface detecting unit 520 includes a selecting unit 521 (selecting unit), a second determining unit 522 (first determining unit), and a third determining unit 523 (second determining unit).

The selecting unit 521 is a functional unit that selects which one of the two side surfaces detected by the rear surface detecting unit 516 is to be adopted as a side surface, when the first determining unit 517 determines that the rear surface of the isolated region has been detected correctly. Specifically, as illustrated in FIG. 22, among the x positions of the two surfaces (the left-side surface position x1 and the right-side surface position x2 illustrated in FIG. 22) of a recognized region (second region) that is a mapping of the isolated region, represented in the recognized region information, in the parallax image Ip, the selecting unit 521 adopts one of the two side surfaces that is nearer to the center of the recognized region (the side surface at the right-side surface position x2 in the example illustrated in FIG. 22). The selecting unit 521 includes the information of the determined side surface in the recognized region information, and sends the resultant recognized region information to the second determining unit 522.

The second determining unit 522 is a functional unit that determines whether the width of the region excluding the side surface selected by the selecting unit 521 (the width W2 illustrated in FIG. 22) is equal to or smaller than 90[%] of the width of the entire recognized region (the width W1 illustrated in FIG. 22), for example. If the second determining unit 522 determines that the width W2 is equal to or smaller than 90[%] of the width W1, the second determining unit 522 determines that the object in the recognized region is an object (vehicle) in which the rear surface and the side surface can be recognized. If the second determining unit 522 determines that the width W2 is greater than 90[%] of the width W1, the second determining unit 522 determines that the object in the recognized region is an object (vehicle) in which only the rear surface can be recognized. The second determining unit 522 includes the determination result in the recognized region information, and sends the resultant recognized region information to the output unit 524.

The third determining unit 523 is a functional unit that determines whether the object represented in the isolated region is a side surface object, when the first determining unit 517 determines that the rear surface of the isolated region has not been detected correctly. The side surface object herein means an object extending in the travelling direction of the vehicle, such as a wall or a guardrail installed on a roadside, and a noise barrier on a freeway, and is an object in which only a side surface thereof is visible in the captured image and the parallax image.

Specifically, the third determining unit 523 determines that the isolated region (recognized region) satisfies every condition indicated as an example in [Table 5]. If every condition is satisfied, the third determining unit 523 determines that the object represented in the isolated region (recognized region) is a side surface object.

TABLE 5

| Items | Descriptions |
| --- | --- |
| Depth (len) | Greater than (1000 [mm] + Error Component) |
| Four Segments in U Map | Segments with Highest Frequencies Has Diagonal Relation |
| Distance Difference (dsp_diff) between Rightmost and Leftmost Segments in x Direction in U Map | Equal to or Greater than 25% of Distance of Nearest Portion |

The third determining unit 523 determines whether the depth len of the isolated region in the real U map satisfies a predetermined condition, as illustrated in a section (a) of FIG. 23. In the example of [Table 5] indicated above, the third determining unit 523 determines whether the depth len is greater than "1000 [mm]+error component".

The third determining unit 523 also converts the frames that are created by the frame creating unit 519 and that represent the recognized regions in the parallax image (detection frames DF1 to DF4 in a parallax image Ip1 illustrated in a section (b) of FIG. 23) into frames in the U map (detection frames DF1a, DF4a in the U map UM1 illustrated in a section (c) of FIG. 23) (fifth regions). In the section (c) of FIG. 23, for the convenience of explanation, the detection frames corresponding to the detection frames DF2, DF3 in the parallax image Ip1 are not illustrated. The third determining unit 523 then divides each of the detection frames in the U map UM1 into two in the x direction, and two in the direction of parallax values dp, into four segments in total, including an upper left segment, a lower left segment, an upper right segment, and a lower right segment as illustrated in the section (c) of FIG. 23. The third determining unit 523 then calculates the sum of frequencies specified in the entire pixels in each of the segments, and determines which pair of the upper left segment and the lower right segment, and of the lower left segment and the upper right segment has resulted in the largest and second largest sums, among the calculated four sums. As indicated in [Table 5] above, the third determining unit 523 determines whether the segments with the higher frequencies have a diagonal relation. For example, using the example of the detection frame DF4a in the U map UM1 illustrated in the section (c) of FIG. 23, the third determining unit 523 determines that the upper left segment and the lower right segment, among the regions having been divided into the four segments, have the larger sums of the frequencies, and determines that these regions have a diagonal relation.

The third determining unit 523 also divides each detection frame in the U map UM1 into four segments in the x direction, as illustrated in the section (c) of FIG. 23. The third determining unit 523 then calculates an average of the parallax values in the leftmost segment and of the parallax values in the rightmost segment, and determines whether a difference (distance difference: dsp_diff) between the distances resulting from converting the averages is equal to or greater than 25[%] of the distance to the nearest portion of the object. For example, using the example of the detection frame DF1a in the U map UM1 illustrated in the section (c) of FIG. 23, the average of the parallax values in the rightmost segment is greater than the average of the parallax values in the leftmost segment, and the third determining unit 523 determines whether the distance difference dsp_diff, which is the difference between the two averages, is equal to or greater than 25[%] of the distance to the nearest portion of the object represented in the detection frame DF1a. Without limitation to determining whether the distance difference is equal to or greater than 25[%] of the distance to the nearest portion, the third determining unit 523 may determine against a value about a distance taking a parallax error component into consideration.

The third determining unit 523 determines that the object represented in the isolated region (recognized region) is a side surface object if the isolated region (recognized region) satisfies every condition indicated in [Table 5] above. If the isolated region (recognized region) does not satisfy at least one of the conditions indicated in [Table 5] above, the third determining unit 523 determines that the object represented in the isolated region (recognized region) is not a side surface object. The third determining unit 523 includes the determination result in the recognized region information, and sends the resultant recognized region information to the output unit 524.

The output unit 524 is a functional unit that outputs the recognized region information including the result of the second surface detecting process performed by the second surface detecting unit 520 to the tracking unit 530.

Each of the selecting unit 521, the second determining unit 522, and the third determining unit 523 that are included in the second surface detecting unit 520, and the output unit 524, all of which are illustrated in FIG. 9, is implemented by the FPGA 51 illustrated in FIG. 6. The selecting unit 521, the second determining unit 522, and the third determining unit 523 that are included in the second surface detecting unit 520, and the output unit 524 may also be implemented by, partly or entirely, causing the CPU 52 to execute a computer program stored in the ROM 53, instead of the FPGA 51 that is a hardware circuit.

The functional units included in the recognition processing unit 5 illustrated in FIG. 9 are merely conceptual representations of their functions, and these functional units are not limited to such a configuration. For example, a plurality of functional units that are illustrated as independent functional units in the recognition processing unit 5 illustrated in FIG. 9 may be configured as one functional unit. Furthermore, the function of one functional unit included in the recognition processing unit 5 illustrated in FIG. 9 may be distributed to a plurality of units, and provided as a plurality of functional units.

Block Matching Process Performed by Parallax Value Deriving Unit

Figure 24:
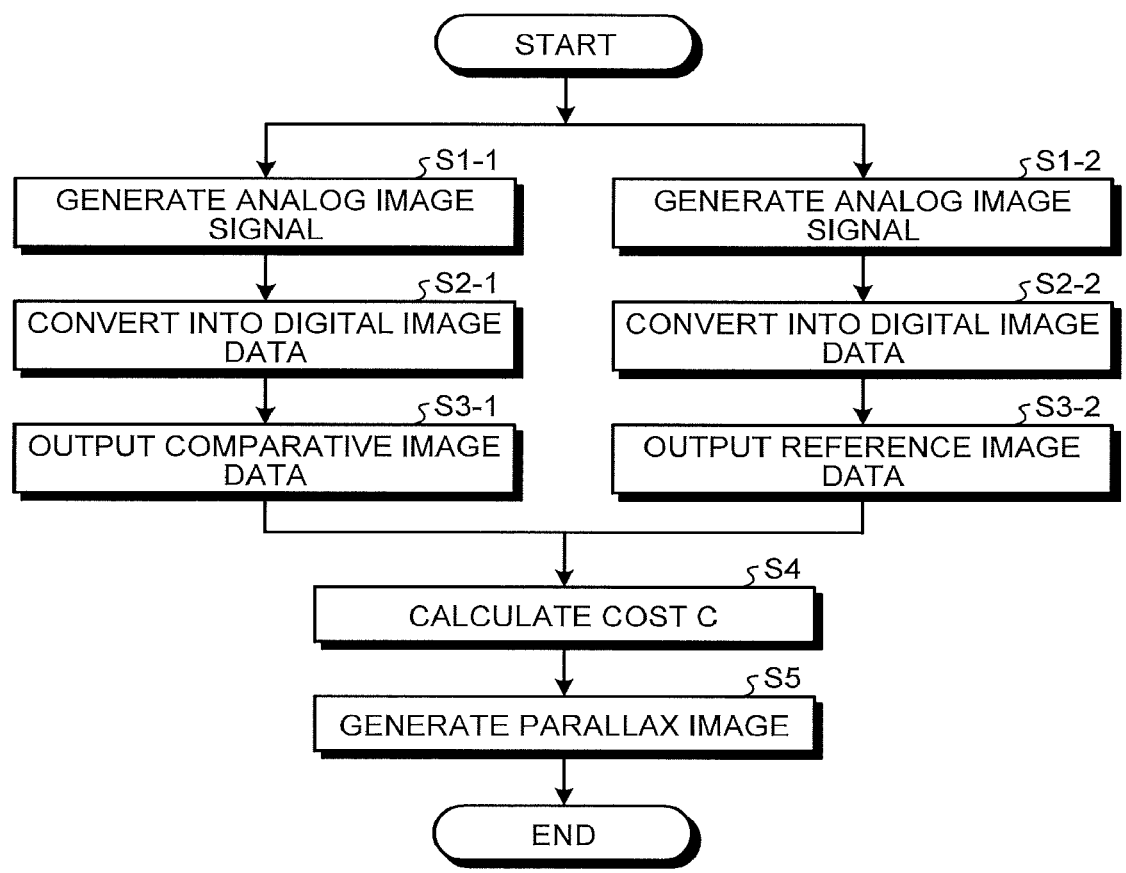
FIG. 24 is a flowchart illustrating an example of an operation of the block matching process performed by a parallax value deriving unit according to the embodiment.

FIG. 24 is a flowchart illustrating an example of an operation of the block matching process performed by the parallax value deriving unit according to the embodiment. The sequence of the operation of the block matching process performed by the parallax value deriving unit 3 included in the object recognition apparatus 1 will now be explained with reference to FIG. 24.

Step S1-1

The image acquiring unit 100b in the parallax value deriving unit 3 captures an image of the subject on the front side thereof using the left camera (the image capturing unit 10b), generates an analog image signal for each, and acquires a luminance image that is an image based on the image signal. Through this process, an image signal to be applied with the subsequent image processing is acquired. The process is then shifted to Step S2-1.

Step S1-2

The image acquiring unit 100a in the parallax value deriving unit 3 captures an image of the subject on the front side using the right camera (the image capturing unit 10a), generates an analog image signal for each, and acquires a luminance image that is an image based on the image signal. Through this process, an image signal to be applied with the subsequent image processing is acquired. The process is then shifted to Step S2-2.

Step S2-1

The conversion unit 200b in the parallax value deriving unit 3 removes noise from the analog image signal acquired by capturing the image with the image capturing unit 10b, and converts the resultant analog image signal into image data in a digital format. In this manner, by converting the analog image signal into image data in a digital format, image processing can be applied to each pixel of an image that is based on the image data. The process is then shifted to Step S3-1.

Step S2-2

The conversion unit 200a in the parallax value deriving unit 3 removes noise from the analog image signal acquired by capturing the image with the image capturing unit 10a, and converts the resultant analog image signal into image data in a digital format. In this manner, by converting the analog image signal into image data in a digital format, image processing can be applied to each pixel of an image that is based on the image data. The process is then shifted to Step S3-2.

Step S3-1

The conversion unit 200b outputs an image that is based on the image data in the digital format, which is resultant of the conversion performed at Step S2-1, as the comparative image Ib in the block matching process. Through this process, an image to be compared, which allows parallax values to be acquired in the block matching process, is acquired. The process is then shifted to Step S4.

Step S3-2

The conversion unit 200a outputs an image that is based on the image data in a digital format, which is resultant of the conversion performed at Step S2-2, as the reference image Ia in the block matching process. Through this process, a reference image, which allows parallax values to be acquired in the block matching process, is acquired. The process is then shifted to Step S4.

Step S4

The cost calculating unit 301 included in the parallax value processing unit 300 that is provided to the parallax value deriving unit 3 acquires, by calculating, the cost C(p, d) for each candidate pixel q(x+d, y), based on the luminance at the reference pixel p(x, y) of the reference image Ia, and on the luminance of the candidate pixel q(x+d, y) that is a candidate as a corresponding pixel. The candidate pixel is identified by shifting the shift amount d from the pixel corresponding to the position of the reference pixel p(x, y) in the comparative image Ib along the epipolar line EL that is based on the reference pixel p(x, y). Specifically, the cost calculating unit 301 calculates dissimilarity between the reference region pb that is a predetermined region having the reference pixel p at the center in the reference image Ia, and the candidate region qb having the candidate pixel q at the center in the comparative image Ib (and having the same size as the reference region pb), as the cost C, through the block matching process. The process is then shifted to Step S5.

Step S5

The determining unit 302 included in the parallax value processing unit 300 that is provided to the parallax value deriving unit 3 then determines the shift amount d corresponding to the minimum cost C calculated by the cost calculating unit 301, as a parallax value dp corresponding to the pixel of the reference image Ia for which the cost C is calculated. The first generating unit 303 included in the parallax value processing unit 300 that is provided to the parallax value deriving unit 3 then generates a parallax image that is an image representing the luminance at each pixel of the reference image Ia as a parallax value dp corresponding to that pixel, based on the parallax value dp determined by the determining unit 302. The first generating unit 303 then outputs the generated parallax image to the recognition processing unit 5.

In the explanation of the stereo matching process described above, the block matching process is used as an example, but the embodiment is not limited thereto. The stereo matching process may be a process using semi-global matching (SGM), for example.

Object Recognition Process Performed by Recognition Processing Unit

Figure 25:
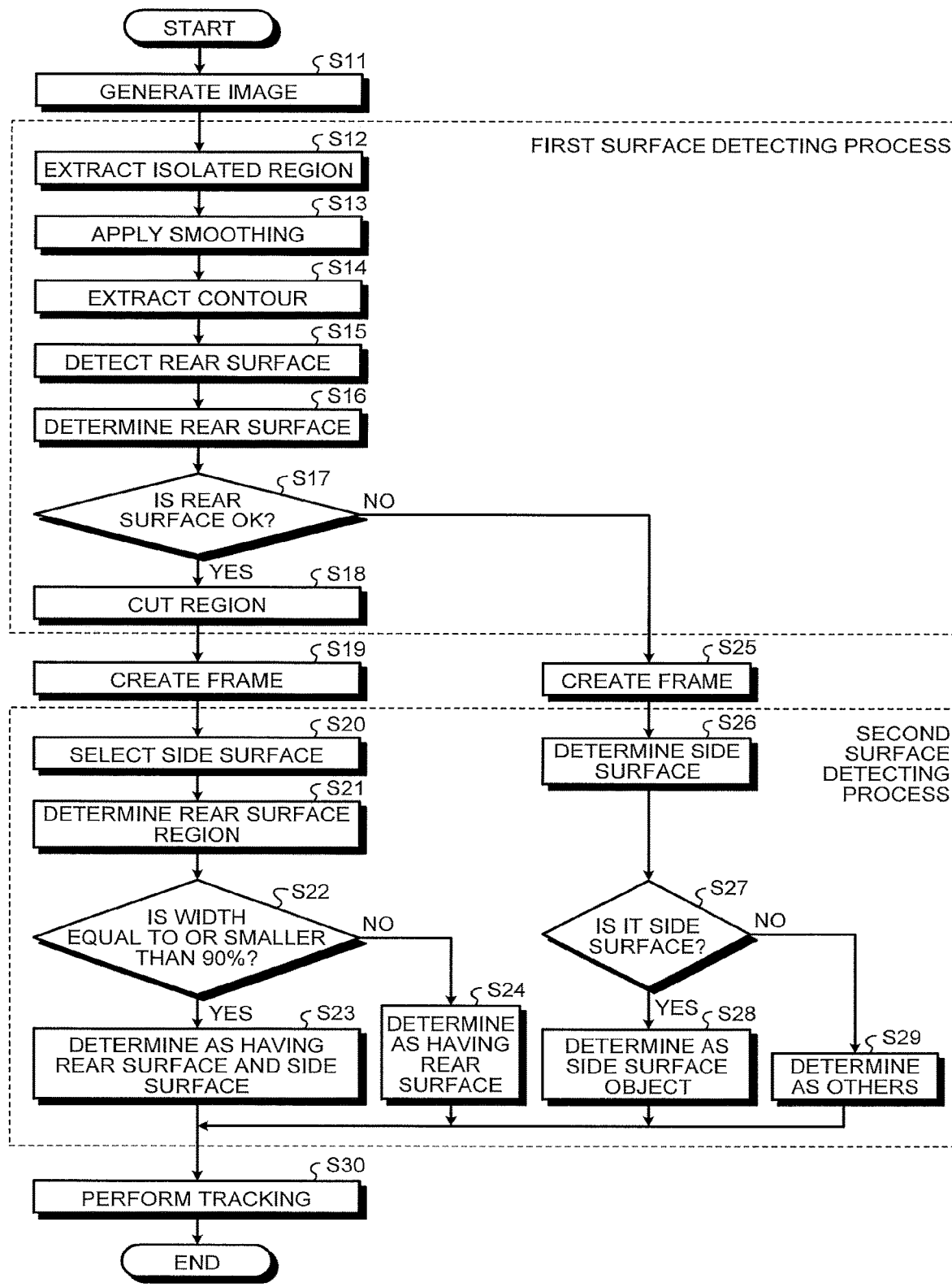
FIG. 25 is a flowchart illustrating an example of an operation of an object recognition process performed by the recognition processing unit according to the embodiment.

FIG. 25 is a flowchart illustrating an example of an operation of the object recognition process performed by the recognition processing unit according to the embodiment. The sequence of the operation of the object recognition process performed by the recognition processing unit 5 included in the object recognition apparatus 1 will now be explained with reference to FIG. 25.

Step S11

The second generating unit 500 receives the parallax image from the parallax value processing unit 300, receives the reference image Ia from the parallax value deriving unit 3, and generates maps such as a V-disparity map, a U-disparity map, and a real U-disparity map. To detect a road surface from the parallax image received from the parallax value processing unit 300, the third generating unit 501 included in the second generating unit 500 generates a V map VM that is a V-disparity map. To recognize objects, the fourth generating unit 502 included in the second generating unit 500 generates a U map UM that is a U-disparity map, using only the information above the detected road surface in the V map VM. The fifth generating unit 503 included in the second generating unit 500 generates a real U map RM that is a real U-disparity map resultant of converting the horizontal axis of the U map UM, which is generated by the fourth generating unit 502, into actual distance. The process is then shifted to Step S12.

Step S12

The input unit 511 inputs the reference image Ia and the parallax image received from the second generating unit 500, and the V map VM, the U map UM, the U map UM_H, and the real U map RM generated by the second generating unit 500. Among the pieces of information output from the input unit 511, the region extracting unit 513 extracts an isolated region that is a cluster of pixel values from the real U map RM. The region extracting unit 513 also generates, for each of the extracted isolated regions, recognized region information that is information related to the isolated region, and, in this example, includes the identification information assigned in the labelling process, and information of the position and the size of the isolated region in the real U map RM, for example, in the recognized region information. The region extracting unit 513 sends the generated recognized region information to the smoothing unit 514. The process is then shifted to Step S13.

Step S13

The smoothing unit 514 applies smoothing for reducing the noise and the parallax dispersion that are present in the real U map RM, to the isolated regions extracted by the region extracting unit 513. Because the smoothing unit 514 fills the isolated region with pixel values, the pixels at a width of one pixel around the original isolated region are filled with pixel values. In the subsequent process, the region including the original isolated region and the region filled with the pixel values is handled as a new isolated region. The smoothing unit 514 includes the information representing the position and the size of the new isolated region in the real U map RM in the recognized region information, and sends the resultant recognized region information to the contour extracting unit 515. The process is then shifted to Step S14.

Step S14

The contour extracting unit 515 extracts the contour by identifying direction vectors (contour vectors) of adjacent pixels, among the pixels forming the contour of the isolated region resultant of the smoothing performed by the smoothing unit 514. As a result of identifying the contour vectors, a number (information) indicating a contour vector is assigned to each of the pixels forming the contour of the isolated region. The contour extracting unit 515 includes the information indicating the contour vectors that are assigned to the respective pixels forming the contour of the isolated region in the recognized region information, and sends the resultant recognized region information to the rear surface detecting unit 516. The process is then shifted to Step S15.

Step S15

The rear surface detecting unit 516 detects the positions of the rear surface of and the side surfaces of the isolated region with the contour thereof having been extracted by the contour extracting unit 515. The rear surface detecting unit 516 includes the information of the positions of the detected rear surface and the side surfaces (the left-side surface and the right-side surface) of the isolated region in the recognized region information, and sends the resultant recognized region information to the first determining unit 517. The process is then shifted to Step S16.

Step S16

The first determining unit 517 determines whether the rear surface detected by the rear surface detecting unit 516 has been detected correctly, that is, determines the validity of the rear surface. The process is then shifted to Step S17.

Step S17

The first determining unit 517 includes the information indicating as to whether the rear surface detected by the rear surface detecting unit 516 has been detected correctly, that is, the result of the determination of the validity of the rear surface, in the recognized region information. If the first determining unit 517 determines that the rear surface has been detected correctly (Yes at Step S17), the first determining unit 517 sends the recognized region information to the cutting unit 518, and the process is shifted to Step S18. If the first determining unit 517 determines that the rear surface has not been detected correctly (No at Step S17), the first determining unit 517 sends the recognized region information to the frame creating unit 519, and the process is shifted to Step S25.

Step S18

If the first determining unit 517 determines that the rear surface is valid, the cutting unit 518 cuts (deletes) a region that is rendered unnecessary (cut region) from the isolated region represented in the recognized region information received from the first determining unit 517. The cutting unit 518 includes the information of the position and the size of the new isolated region, subsequent to the cutting, in the real U map RM in the recognized region information, and sends the resultant recognized region information to the frame creating unit 519. The process is then shifted to Step S19.

Step S19

The frame creating unit 519 creates a frame around the object region corresponding to the isolated region (recognized region) in the parallax image (or the reference image Ia), using the isolated region extracted by the region extracting unit 513, smoothed by the smoothing unit 514, having a contour extracted by the contour extracting unit 515, having the rear surface and the side surfaces detected by the rear surface detecting unit 516, and having an unnecessary part cut (deleted) by the cutting unit 518, in the real U map RM. The frame creating unit 519 includes the information of the frame created on the parallax image (or the reference image Ia) in the recognized region information, and sends the resultant recognized region information to the second surface detecting unit 520. The process is then shifted to Step S20.

Step S20

If the first determining unit 517 determines that the rear surface of the isolated region has been detected correctly, the selecting unit 521 selects which one of the two side surfaces detected by the rear surface detecting unit 516 is to be adopted as a side surface. The selecting unit 521 includes the information of the determined side surface in the recognized region information, and sends the resultant recognized region information to the second determining unit 522. The process is then shifted to Step S21.

Step S21

The second determining unit 522 determines whether the width of the region other than the side surface selected by the selecting unit 521 (the width W2 illustrated in FIG. 22) is equal to or smaller than 90[%] of the width of the entire recognized region (the width W1 illustrated in FIG. 22), for example. The process is then shifted to Step S22.

Step S22

If the width W2 is equal to or smaller than 90[%] of the width W1 (Yes at Step S22), the process is shifted to Step S23. If the width W2 is greater than the 90[%] of width W1 (No at Step S22), the process is shifted to Step S24.

Step S23

If the second determining unit 522 determines that the width W2 is equal to or smaller than 90[%] of the width W1, the second determining unit 522 determines that the object in the recognized region is an object (vehicle) in which the rear surface and the side surface can be recognized. The second determining unit 522 includes the determination result in the recognized region information, and sends the resultant recognized region information to the output unit 524. The process is then shifted to Step S30.

Step S24

If the second determining unit 522 determines that the width W2 is greater than 90[%] of the width W1, the second determining unit 522 determines that the object in the recognized region is an object (vehicle) in which only the rear surface can be recognized. The second determining unit 522 then includes the determination result in the recognized region information, and sends the resultant recognized region information to the output unit 524. The process is then shifted to Step S30.

Step S25

The frame creating unit 519 is a functional unit that creates a frame around the object region corresponding to the isolated region (recognized region) in the parallax image (or the reference image Ia), using the isolated region extracted by the region extracting unit 513, smoothed by the smoothing unit 514, having a contour extracted by the contour extracting unit 515, and having the rear surface and the side surfaces detected by the rear surface detecting unit 516 in the real U map RM. The frame creating unit 519 includes the information of the frame created on the parallax image (or the reference image Ia) in the recognized region information, and sends the resultant recognized region information to the second surface detecting unit 520. The process is then shifted to Step S26.

Step S26

If the first determining unit 517 determines that the rear surface of the isolated region has not been detected correctly, the third determining unit 523 determines whether the object represented in the isolated region is a side surface object. Specifically, the third determining unit 523 determines whether the isolated region (recognized region) satisfies every condition indicated as an example in [Table 5] above. The process is then shifted to Step S27.

Step S27

If the isolated region (recognized region) satisfies every condition indicated in [Table 5] above (if a side surface is detected) (Yes at Step S27), the process is shifted to Step S28. If the isolated region (recognized region) does not satisfy at least one of the conditions indicated in [Table 5] above (if no side surface is detected) (No at Step S27), the process is shifted to Step S29.

Step S28

If the isolated region (recognized region) satisfies every condition indicated in [Table 5] above, the third determining unit 523 determines that the object represented in the isolated region (recognized region) is a side surface object. The third determining unit 523 includes the determination result in the recognized region information, and sends the resultant recognized region information to the output unit 524. The process is then shifted to Step S30.

Step S29

If the isolated region (recognized region) does not satisfy at least one of the conditions indicated in [Table 5] above, the third determining unit 523 determines that the object represented in the isolated region (recognized region) is an object that is not a side surface object (another type of object). The third determining unit 523 includes the determination result in the recognized region information, and sends the resultant recognized region information to the output unit 524. The process is then shifted to Step S30.

Step S30

The tracking unit 530 executes a tracking process for rejecting the object or tracking the object based on the recognized region information that is information related to the object recognized by the clustering processing unit 510.

The object recognition process is performed as processes at Steps S11 to S30 described above. The processes at Steps S13 to S30 are executed for each of the isolated regions extracted at Step S12.

As described above, the contour extracting unit 515 extracts the contour of the isolated region that is extracted from the real U map RM by the region extracting unit 513, by identifying the direction vectors (contour vectors) in the adjacent pixels, among the pixels forming the contour. The rear surface detecting unit 516 then detects the rear surface and the side surfaces of the isolated region using the contour vectors. In this manner, surfaces (the rear surface and the side surface) can be detected based on the contour vectors identified in the isolated region, without referring to a database or the like for matching the feature value of an object to detect a surface (a rear surface and side surfaces) of the object represented in the extracted isolated region. In other words, because a surface is detected based on the vectors between the pixels forming the contour of the isolated region, a surface of the object can be detected at a better accuracy, and the processing speed of surface detection can be improved.

In the embodiment described above, the cost C is explained to be an evaluation representing dissimilarity, but may also be an evaluation representing similarity. In such a case, the shift amount d resulting in the highest cost C (extreme), which is similarity, serves as a parallax value dp.

Furthermore, in the embodiment described above, the object recognition apparatus that is provided onboard an automobile that is the vehicle 70 is explained, but the present invention is not limited thereto. For example, the object recognition apparatus may be provided onboard another type of vehicle such as a motorcycle, a bicycle, a wheelchair, or a cultivator for an agricultural application. Furthermore, another example of a moving body includes a moving body such as a robot, in addition to a vehicle.

Furthermore, in the embodiment described above, when at least one of the functional units of the parallax value deriving unit 3 and the recognition processing unit 5 included in the object recognition apparatus 1 is implemented by execution of a computer program, the computer program is provided incorporated in a ROM or the like in advance. Furthermore, a computer program executed by the object recognition apparatus 1 according to the embodiment may be provided in a manner recorded in a computer-readable recording medium such as a CD-ROM, a flexible disk (FD), a CD-R, or a DVD, as a file in an installable or executable format. Furthermore, the computer program executed by the object recognition apparatus 1 according to the embodiment described above may be stored in a computer connected to a network such as the Internet, and made available for download over the network. Furthermore, the computer program executed by the object recognition apparatus 1 according to the embodiment described above may be provided or distributed over a network such as the Internet. Furthermore, the computer program executed by the object recognition apparatus 1 according to the embodiment described above has a modular structure including at least one of the functional units described above. As actual hardware, by causing the CPU 52 (the CPU 32) to read the computer program from the ROM 53 (the ROM 33), and to execute the computer program, the functional units described above are loaded and generated onto the main memory (such as the RAM 54 (the RAM 34)).

According to the embodiment, the processing speed of the process of detecting a surface of a recognized object can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
   first extracting circuitry configured to extract a first region in which an object is represented, from a distance image that is drawn using distance information, based on the distance information of the object calculated from an image of the object captured by image capturing circuitry;
   second extracting circuitry configured to extract a contour direction that is a direction along which pixels forming a contour of the first region are arrayed; and
   detecting circuitry configured to detect a first surface facing the image capturing circuitry from the first region, based on the contour direction extracted by the second extracting circuitry.

2. The image processing apparatus according to claim 1, wherein
   the second extracting circuitry identifies a direction in which the pixels forming the contour of the first region are in adjacency, and extracts the direction as the contour direction.

3. The image processing apparatus according to claim 1, wherein
   the detecting circuitry changes a sequence in which the contour direction of the first region is extracted, based on a direction in which the first region is scanned.

4. The image processing apparatus according to claim 1, wherein
   the detecting circuitry detects two second surfaces that are connected to both ends of the first surface, based on the contour direction within a range between the first surface of the first region and a predetermined position in a direction moving away from the image processing apparatus.

5. The image processing apparatus according to claim 4, further comprising:
   selecting circuitry configured to select one of the second surfaces that is nearer to a center of a second region that is a region corresponding to the first region in the distance image serving as the distance information, among positions of the two second surfaces of the second region; and
   first determining circuitry configured to
      determine that an object represented in the second region is an object including the first surface and the second surface selected by the selecting circuitry when a width between a position of the second surface and an end of the second region in a direction travelling toward the center is equal to or smaller than a predetermined percentage of a width of the entire second region, and
      determine that the object represented in the second region is an object including only the first surface when the width is greater than the predetermined percentage.

6. The image processing apparatus according to claim 1, further comprising:
   first generating circuitry configured to generate a first frequency image from the distance information, the first frequency image representing a frequency distribution of distance values in which a distance in a direction perpendicular to a moving direction of the image processing apparatus is mapped to a distance value or a distance corresponding to the moving direction, wherein
   the first extracting circuitry extracts the first region from the first frequency image.

7. The image processing apparatus according to claim 1, further comprising deleting circuitry configured to delete a third region from the first region, the third region being positioned on a near side of at least the first surface, and establish a resultant region as a new first region.

8. The image processing apparatus according to claim 7, wherein
the deleting circuitry identifies a continuous fourth region having a predetermined depth from the third region, and
when a width of the fourth region in a direction perpendicular to a moving direction of the image processing apparatus is smaller than a width corresponding to a predetermined percentage of the width of the first region, the deleting circuitry deletes a far-side region from the first region, the far-side region facing the fourth region and being on the far side of the first region, and establishes the resultant region as a new first region.

9. The image processing apparatus according to claim 1, further comprising:
second generating circuitry configured to generate a second frequency image from the distance image serving as the distance information, the second frequency image representing a frequency distribution of distance values in which a horizontal direction of the distance image is mapped to a distance value or a distance corresponding to a moving direction of the image processing apparatus; and
second determining circuitry configured to determine whether an object represented in the first region is a side surface object, based on a distance value included in a fifth region corresponding to the first region, in the second frequency image.

10. An image processing method comprising:
extracting a first region in which an object is represented, from a distance image that is drawn using distance information, based on the distance information of the object calculated from an image of the object captured by image capturing;
extracting a contour direction that is a direction along which pixels forming a contour of the first region are arrayed; and
detecting a first surface facing the image capturing unit from the first region, based on the extracted contour directions.

11. A non-transitory computer-readable recording medium that contains a computer program that causes a computer to function as:
first extracting circuitry configured to extract a first region in which an object is represented, from a distance image that is drawn using distance information, based on the distance information of the object calculated from an image of the object captured by an image capturing circuitry;
second extracting circuitry configured to extract a contour direction that is a direction along which pixels forming a contour of the first region are arrayed; and
detecting circuitry configured to detect a first surface facing the image capturing circuitry from the first region, based on the contour direction extracted by the second extracting circuitry.

12. The non-transitory computer-readable medium according to claim 11, wherein the computer program further causes the computer to function such that:
the second extracting circuitry identifies a direction in which the pixels forming the contour of the first region are in adjacency, and extracts the direction as the contour direction.

13. The non-transitory computer-readable medium according to claim 11, wherein the computer program further causes the computer to function such that:
the detecting circuitry changes a sequence in which the contour direction of the first region is extracted, based on a direction in which the first region is scanned.

14. The non-transitory computer-readable medium according to claim 11, wherein the computer program further causes the computer to function such that:
the detecting circuitry detects two second surfaces that are connected to both ends of the first surface, based on the contour direction within a range between the first surface of the first region and a predetermined position in a direction moving away from the image processing apparatus.

15. The method according to claim 10, wherein
the extracting the contour direction identifies a direction in which the pixels forming the contour of the first region are in adjacency, and extracts the direction as the contour direction.

16. The method according to claim 10, wherein
the detecting changes a sequence in which the contour direction of the first region is extracted, based on a direction in which the first region is scanned.

17. The method according to claim 10, wherein
the detecting detects two second surfaces that are connected to both ends of the first surface, based on the contour direction within a range between the first surface of the first region and a predetermined position in a direction moving away from an image processing apparatus that performs the image capturing.

* * * * *